United States Patent
Grandl et al.

(10) Patent No.: US 12,447,124 B2
(45) Date of Patent: Oct. 21, 2025

(54) AQUEOUS DISPERSIONS OF PRE-CROSSLINKED ORGANOPOLYSILOXANES

(71) Applicant: Wacker Chemie AG, Munich (DE)

(72) Inventors: Markus Grandl, Munich (DE); Gerhard Beer, Burghausen (DE); Werner Limmer, Pleiskirchen (DE); Ernst Selbertinger, Burghausen (DE)

(73) Assignee: Wacker Chemie AG, Munich (DE)

(*) Notice: Subject to any disclaimer, the term of this patent is extended or adjusted under 35 U.S.C. 154(b) by 786 days.

(21) Appl. No.: 17/614,083

(22) PCT Filed: May 29, 2019

(86) PCT No.: PCT/EP2019/064120
§ 371 (c)(1),
(2) Date: Nov. 24, 2021

(87) PCT Pub. No.: WO2020/239229
PCT Pub. Date: Dec. 3, 2020

(65) Prior Publication Data
US 2022/0218589 A1    Jul. 14, 2022

(51) Int. Cl.
| A61K 8/898 | (2006.01) |
| A61K 8/06 | (2006.01) |
| A61Q 5/12 | (2006.01) |
| C08G 77/26 | (2006.01) |
| C08J 3/07 | (2006.01) |

(52) U.S. Cl.
CPC .............. *A61K 8/898* (2013.01); *A61K 8/062* (2013.01); *A61Q 5/12* (2013.01); *C08G 77/26* (2013.01); *C08J 3/07* (2013.01); *C08J 2383/08* (2013.01)

(58) Field of Classification Search
CPC .......... A61K 8/898; A61K 8/062; A61Q 5/12; C08G 77/26; C08J 3/07; C08J 2383/08
See application file for complete search history.

(56) References Cited

U.S. PATENT DOCUMENTS

| 4,977,198 | A | * | 12/1990 | Eckberg | C08G 77/38 522/170 |
| 5,039,738 | A |   | 8/1991  | Czech   |                    |
| 5,399,652 | A | * | 3/1995  | Bindl   | C08L 83/08 528/26  |
| 5,973,066 | A | * | 10/1999 | Sakuta  | C08J 3/03 516/55   |
| 7,129,369 | B2 |  | 10/2006 | Heller et al. |         |
| 7,220,408 | B2 |  | 5/2007  | Decoster et al. |       |
| 7,223,385 | B2 |  | 5/2007  | Gawtrey et al. |        |
| 7,485,289 | B2 |  | 2/2009  | Gawtrey et al. |        |
| 7,504,094 | B2 |  | 3/2009  | Decoster et al. |       |
| 8,609,787 | B2 |  | 12/2013 | Hansen et al. |         |
| 9,539,199 | B2 | * | 1/2017 | Beer | A61Q 5/006 |
| 10,669,421 | B2 | * | 6/2020 | Achenbach | B33Y 10/00 |
| 11,197,818 | B2 | * | 12/2021 | Brehm | A61Q 5/02 |
| 11,931,673 | B2 | * | 3/2024 | Grandl | B01D 19/0409 |
| 2008/0292574 | A1 |  | 11/2008 | Uehara |  |
| 2008/0318057 | A1 |  | 12/2008 | Sherman et al. |  |
| 2013/0142749 | A1 |  | 6/2013  | Paul et al. |  |

FOREIGN PATENT DOCUMENTS

| EP | 0298402 A2 | * | 1/1989 | ............ C08G 77/46 |
| JP | H0873747 A |   | 3/1996 | |
| JP | 2002537434 A |  | 11/2002 | |
| KR | 100712759 B1 |  | 5/2007 | |
| KR | 20100050467 A |  | 5/2010 | |
| WO | 2004039930 A2 |  | 5/2004 | |
| WO | 2015024079 A1 |  | 2/2015 | |

OTHER PUBLICATIONS

M.D. Berthiaume, Society of Cosmetic Chemists, Monograph, Silicones in Hair Care, 1997.
J. Sejpka, SÖFW-Journal, No. 17, 1992, p. 1065-1070.
K. Krummel, Stephane Chiron, J. Jachowicz, Chapter 14, „The Chemistry and Manufacture of Cosmetics, vol. II.
K. Schrader, A. Domsch, Cosmetology—Theory and Practice, vol. II, p. II-8 to II-22, 2005.
Y. K. Kamath and Hans-Dietrich Weigmann, J. Soc. Cosmet. Chem., 37, 111-124, 1986.

\* cited by examiner

*Primary Examiner* — Blessing M Fubara

(57) ABSTRACT

An aqueous of pre-crosslinked organopolysiloxanes and process for producing the same. The aqueous dispersion is preferably aqueous emulsion, including pre-crosslinked organopolysiloxanes which contains on average at least one structural unit of the general formula $SiRO_{2/2}$—Y—$SiRO_{2/2}$ and units of the formula $R_2SiO_{2/2}$. Where Y is a radical of the formula

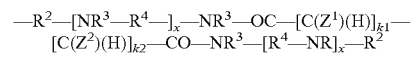

and where R, $R^2$, $R^3$, $R^4$, k1, k2, x, $Z^1$ and $Z^2$ have a definition a set forth within herein. Additionally, the sum of k1+k2 is ≥1, the that at least one radical $Z^1$ or $Z^2$ is a hydroxyl or $NHR^3$ group, preferably a hydroxyl group, and so the bridging group Y contains at least one hydroxyl or $NHR^3$ group, preferably at least one hydroxyl group.

27 Claims, No Drawings

AQUEOUS DISPERSIONS OF PRE-CROSSLINKED ORGANOPOLYSILOXANES

CROSS-REFERENCE TO RELATED APPLICATIONS

This application is a U.S. National Phase application of PCT Application No. PCT/EP2019/064120 filed on May 29, 2019 the disclosure of which is incorporated by reference herein in its entirety.

The invention relates to aqueous dispersions of precrosslinked organopolysiloxanes, to precrosslinked organopolysiloxanes and to cosmetic compositions comprising aqueous dispersions of precrosslinked organopolysiloxanes. The invention further relates to processes for producing the precrosslinked organopolysiloxanes and aqueous dispersions thereof. The invention further relates to the use of the cosmetic compositions.

Organopolysiloxanes are used in cosmetic compositions, such as for example in haircare products, on account of their conditioning properties, such as improving softness and smoothness, reducing combing forces, shine properties, improving perceived colors, color protection properties, reducing instances of electrostatic charging, protection properties associated with thermal loads on the hair, or water repellency.

An overview of selected organopolysiloxanes for the care of keratin materials such as hair is found in M.D. Berthiaume, Society of Cosmetic Chemists (ed.), monograph, Silicones in Hair Care, 1997 and J. Sejpka, Silicone in Haarpflegeprodukten, [Silicones in Haircare Products] in: SÖFW-Journal, volume 118, No. 17, 1992, pp. 1065-1070.

In everyday life, hair is exposed to a multitude of external influences which lead to damage to the hair surface and hence impair the cosmetic properties such as smoothness, softness, shine and other parameters as compared with undamaged hair. Damage to the hair surface may be caused, for example, by chemical or mechanical treatment, by UV radiation or by heat. Accompanying the surface damage to hair is the destruction and partial removal of the lipid layer covering the cuticle, which is the reason for the highly hydrophobic quality of undamaged natural hair (R. A. Lodge, B. Bhusan, Wetting Properties of Human Hair by Means of Dynamic Contact Angle Measurement, Journal of Applied Polymer Science, vol. 102, 5255-5265, 2006, Wiley). By comparison with undamaged hair, damaged hair is significantly more hydrophilic, since the effective hair surface following destruction of the superficial lipid layer is a hydrophilic, amino acid-based protein matrix.

U.S. Pat. No. 7,223,385 B2, U.S. Pat. No. 7,485,289 B2, U.S. Pat. No. 7,220,408 B2 and U.S. Pat. No. 7,504,094 B2 describe cosmetic compositions for treating hair that comprise specific aminosilicones of the structure (I) or (II) and also a conditioning agent or a thickener. The aminosilicones of the structure (I) or (II) are dimethylpolysiloxanes which have terminal alkoxy/hydroxyl groups and have aminoethylaminopropyl-alkoxysiloxane units or aminoethylaminopropyl-methylsiloxane units, which are uncrosslinked.

Known from U.S. Pat. No. 5,039,738 A is a process for producing modified aminoorganosiloxanes by reacting aminoorganosiloxanes in aqueous emulsions with dialkyl oxalates, dialkyl pyrocarbonates or a mixture thereof. It emerged that fabrics treated with the emulsions described exhibit reduced yellowing.

WO 2015/024079 A1 describes cosmetic compositions which contain aminoorganopolysiloxanes, cationic surfactants and dialkyl esters of dicarboxylic acids of the formula R'—O—CO—R—CO—O—R' wherein R' constitutes C8-C30 radical.

According to WO 2004/039930 A2, fabrics treated with a composition composed of polycarboxylic acids and aminoorganosiloxanes display enhanced resistance to puckering and creasing.

A crosslinkable composition composed of aminoorganopolysiloxane and a crosslinker component which is an alkoxysilane or siloxane containing at least one carboxylic anhydride group is described in U.S. Pat. No. 5,399,652 A.

The object was to provide precrosslinked organopolysiloxanes, more particularly aqueous dispersions of precrosslinked organopolysiloxanes, which preferably form an elastomeric film on removal of the water and which can be used in cosmetic compositions. A further object was to provide cosmetic compositions for treating keratinic fibers, such as hair, preferably for providing them with cleansing and care, which can be used for conditioning keratinic fibers, such as hair, more particularly for providing it with facilitated combability.

The object is achieved by the invention.

A subject of the invention are aqueous dispersions, preferably aqueous emulsions, comprising precrosslinked organopolysiloxanes which contain on average at least one structural unit, preferably at least two structural units, more preferably at least three structural units of the general formula $$SiRO_{2/2}—Y—SiRO_{2/2} \qquad (I)$$

and units of the formula $$R_2SiO_{2/2} \qquad (II),$$

where
Y is a radical of the formula

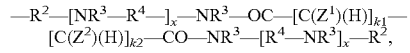

R may be identical or different and denotes a monovalent hydrocarbon radical which has 1 to 18 carbon atoms and may contain one or more heteroatoms from the group of N, P, S, O, and halogen,
$R^2$ denotes an SiC-bonded, divalent linear or branched hydrocarbon radical having 3 to 18 carbon atoms, preferably an alkylene radical having 3 to 10 carbon atoms,
$R^3$ denotes a hydrogen atom, an alkyl radical having 1 to 8 carbon atoms or an acyl radical, such as acetyl radical, and preferably is a hydrogen atom,
$R^4$ denotes a divalent hydrocarbon radical having 1 to 6 carbon atoms, preferably an alkylene radical having 1 to 6 carbon atoms,
k1 is 0, 1, 2 or 3,
k2 is 0, 1, 2 or 3,
x is 0, 1, 2, 3 or 4, preferably 0 or 1,
$Z^1$ is —OH, H or —NHR$^3$,
$Z^2$ is —OH, H or —NHR$^3$,
with the provisos that the sum k1+k2 is ≥1 and that at least one radical $Z^1$ or $Z^2$ is a hydroxyl or NHR$^3$ group, preferably a hydroxyl group, and so the bridging group Y contains at least one hydroxyl group or NHR$^3$ group.

A further subject of the invention are precrosslinked organopolysiloxanes which contain on average at least one structural unit, preferably at least two structural units, more preferably at least three structural units of the general formula $$SiRO_{2/2}—Y—SiRO_{2/2} \qquad (I)$$

and units of the formula $$R_2SiO_{2/2} \quad (II),$$

where
Y is a radical of the formula $$-R^2-[NR^3-R^4-]_x-NR^3-OC-[C(Z^1)(H)]_{k1}-[C(Z^2)(H)]_{k2}-CO-NR^3-[R^4-NR^3]_x-R^2,$$

R, $R^2$, $R^3$, $R^4$, k1, k2, $Z^1$ and $Z^2$ have the definition indicated for them above,
with the provisos that the sum k1+k2 is ≥1 and that at least one radical $Z^1$ or $Z^2$ is a hydroxyl or $NHR^3$ group, preferably a hydroxyl group,
and so the bridging group Y contains at least one hydroxyl or $NHR^3$ group, preferably at least one hydroxyl group.

A further subject of the invention is a process for producing the aqueous dispersions of precrosslinked organopolysiloxanes, by reacting
aqueous dispersions, preferably aqueous emulsions, comprising aminoorganopolysiloxanes (1) of the formula $$(R^1O)_dA_eR_{3-d-e}SiO(SiARO)_p(SiR_2O)_qSiR_{3-d-e}A_e(OR^1)_d \quad (IV),$$

where
A is an amino radical of the general formula $$-R^2-[NR^3-R^4-]_xNR^3{}_2,$$

R may be identical or different and denotes a monovalent hydrocarbon radical which has 1 to 18 carbon atoms and may contain one or more heteroatoms from the group of N, P, S, O, and halogen,
$R^1$ may be identical or different and denotes a hydrogen atom or an alkyl radical which has 1 to 18 carbon atoms and may be interrupted by one or more separate oxygen atoms,
$R^2$ denotes an SiC-bonded, divalent linear or branched hydrocarbon radical having 3 to 18 carbon atoms, preferably an alkylene radical having 3 to 10 carbon atoms,
$R^3$ denotes a hydrogen atom, an alkyl radical having 1 to 8 carbon atoms or an acyl radical, such as acetyl radical, and preferably is a hydrogen atom,
$R^4$ denotes a divalent hydrocarbon radical having 1 to 6 carbon atoms, preferably an alkylene radical having 1 to 6 carbon atoms,
d is 0 or 1,
e is 0 or 1,
p is an integer of at least one, preferably at least 2, more preferably at least 3, and at most 1000, preferably at most 10, and
q is 0 or an integer from 1 to 2000, preferably 50 to 1000,
x is 0, 1, 2, 3 or 4, preferably 0 or 1, with reactive esters (2) of the formula $$R^5O_2C-[C(Z^1)(H)]_{k1}-[C(Z^2)(H)]_{k2}-CO_2R_5 \quad (V),$$

where
$R^5$ may be identical or different and denotes an O-bonded, saturated or unsaturated, linear or branched, monovalent hydrocarbon radical which has 1-20 carbon atoms per radical and may contain one or more heteroatoms from the group of N, P, S, O and halogen,
k1 is 0, 1, 2 or 3,
k2 is 0, 1, 2 or 3,
$Z^1$ is —OH, H or —$NHR^3$,
$Z^2$ is —OH, H or —$NHR^3$,
with the provisos that the sum k1+k2 is ≥1 and that at least one radical $Z^1$ or $Z^2$ is a hydroxyl or $NHR^3$ group, preferably a hydroxyl group.

A further subject of the invention is a process for producing the precrosslinked organopolysiloxanes, characterized in that aminoorganopolysiloxanes (1) of the formula $$(R^1O)_dA_eR_{3-d-e}SiO(SiARO)_p(SiR_2O)_qSiR_{3-d-e}A_e(OR^1)_d \quad (IV)$$

are reacted with reactive esters (2) of the formula $$R^5O_2C-[C(Z^1)(H)]_{k1}-[C(Z^2)(H)]_{k2}-CO_2R^5 \quad (V)$$

where
A, R, R', $R^5$, d, e, k1, k2, $Z^1$ and $Z^2$ have the definitions indicated for them above, with the provisos that the sum k1+k2 is ≥1 and that at least radical $Z^1$ or $Z^2$ is a hydroxyl or $NHR^3$ group, preferably a hydroxyl group,
and the resulting precrosslinked organopolysiloxanes are optionally subsequently emulsified in water.

In the process of the invention, aminoorganopolysiloxanes (1) of the formula (IV) that are used are preferably those in which e is 0, and which therefore contain only pendant amino radicals A and in the reaction with the reactive esters (2) form bridges in accordance with structural units of the formula (I).

If e is 0, the precrosslinked organopolysiloxanes of the invention comprise not only structural units of the formula (I) and siloxane units of the formula (II) but also, preferably siloxane units of the formula $$R_{3-d}(OR^1)_dSiO_{1/2} \quad (III),$$

where R, $R^1$ and d have the definition indicated for them above.

It is, however, also possible to use aminoorganopolysiloxanes (1) of the formula (IV) which also contain terminal amino radicals A, and for which, in other words, e is 1.

It is also possible to use mixtures of aminoorganopolysiloxanes (1) of the formula (IV) with e being 0 and e being 1. In this case, in the reaction with the reactive esters (2), bridges between two terminal amino radicals (formula (VI)) or between terminal and pendant amino radicals (formula (VII)) may additionally be formed.

Furthermore, in addition to the aminoorganopolysiloxanes (1), it is possible to use aminoorganopolysiloxanes (1a) containing only terminal amino radicals, of the formula $$(R^1O)_fAR_{2-f}SiO(SiR_2O)nSiR_{2-f}A(OR^1)_f \quad (IVa),$$

where A, R and $R^1$ have the definition indicated for them above,
f is 0 or 1, and
n is an integer from 1 to 1000, preferably 50 to 1000, with the proviso that there is on average at least one amino radical A present.

Consequently, as bridges, besides the structural units of the formula (I), the precrosslinked organopolysiloxanes of the invention may comprise further structural units of the formulae $$SiR_2O_{1/2}-Y-SiR_2O_{1/2} \quad (VI),$$

or $$SiRO_{2/2}-Y-SiR_{2O1/2} \quad (VII),$$

or mixtures of (VI) and (VII), where R and Y have the definition indicated for them above.

The precrosslinked organopolysiloxanes of the invention preferably comprise siloxane units of the formula (III) where d is 0 or 1, preferably 1.

The pendant and optionally terminal amino radicals A in the aminoorganopolysiloxanes (1) used in the invention or aminoorganopolysiloxanes (1a) optionally also used may possibly also react with the reactive esters (2) without forming bridges, and so the precrosslinked organopolysiloxanes may additionally contain structural units of the formulae $$SiRO_{2/2}-R^2-[NR^3-R^4-]_xNR^3-OC-[C(Z^1)(H)]_{k1}-[C(Z^2)(H)]_{k2}-CO_2R^5 \quad (VIIIa)$$

and/or $$SiR_2O_{1/2}-R^2-[NR^3-R^4-]_xNR^3-OC-[C(Z^1)(H)]_{k1}-[C(Z^2)(H)]_{k2}-CO_2R^5 \quad (VIIIb),$$

where
$R$, $R^2$, $R^3$, $R^4$, $R^5$, k1, k2, x, $Z^1$ and $Z^2$ have the definition indicated for them above.

For the purposes of this invention, formula (IV) is to be understood to mean that p units —(SiARO— and q units —SiR$_2$O— may be distributed in any desired way, in block or random form, for example, in the aminoorganopolysiloxane molecule.

Though not expressed by the formula (IV) and (IVa), respectively, the aminoorganopolysiloxanes (1) used in the invention and aminoorganopolysiloxanes (1a) optionally used as well may also comprise siloxane units of the formulae (IXa) and/or (IXb) and/or (IXc)

$$RSiO_{3/2}, (OR^1)SiO_{3/2}, SiO_{4/2} \quad (IXa-c)$$

where
R and $R^1$ have the definition indicated for them above,
and so the precrosslinked organopolysiloxanes of the invention may also comprise siloxane units of the formulae (IXa-c).

Preferably R is a monovalent, saturated or unsaturated hydrocarbon radical having 1 to 18 carbon atoms.

Examples of hydrocarbon radicals R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl, cycloheptyl radical and methylcyclohexyl radicals; alkenyl radicals, such as the vinyl, 5-hexenyl, cyclohexenyl, 1-propenyl, allyl, 3-butenyl and 4-pentenyl radical; aryl radicals, such as the phenyl, naphthyl, anthryl and phenanthryl radical; alkaryl radicals, such as o-, m-, and p-tolyl radicals; xylyl radicals and ethylphenyl radicals; and aralkyl radicals, such as the benzyl radical, the ☐- and the ☐-phenylethyl radical.

Preferred as radical R are the methyl, ethyl, octyl and phenyl radical, more preferably the methyl and ethyl radical.

Examples of substituted radicals R are haloalkyl radicals, such as the 3,3,3-trifluoro-n-propyl radicals, the 2,2,2,2',2',2'-hexafluoroisopropyl radical, the heptafluoroisopropyl radical, and haloaryl radicals, such as the o-, m- and p-chlorophenyl radical.

Further examples of substituted radicals R are polyalkyleneoxy groups, such as polyethyleneoxy, polypropyleneoxy or polyethyleneoxy/polypropyleneoxy groups.

Examples of radical $R^1$ are the alkyl radicals recited above for R, and also the methoxyethyl, the ethoxyethyl and the hexoxyethyl radical; preferably the radical $R^1$ is hydrogen and the methyl and the ethyl radical.

Preferably $R^5$ is a $C_{1-20}$ hydrocarbon radical interrupted by one or more oxygen atoms. Examples of radicals R are also valid for radicals $R^5$. More preferably $R^5$ is a $C_{1-4}$ alkyl radical, such as methyl or ethyl radical.

Examples of radicals A are:
—$(CH_2)_3NH_2$
—$(CH_2)_3$—NH—$(CH_2)_2$—$NH_2$
—$CH_2CH(CH_3)CH_2$—NH—$(CH_2)_2$—$NH_2$
—$(CH_2)_3$—NH(cyclohexyl)
—$(CH_2)_3$—$NHCH_3$
—$(CH_2)_3$—$N(CH_3)_2$
—$(CH_2)_3$—$NHCH_2CH_3$
—$(CH_2)_3$—$N(CH_2CH_3)_2$
—$(CH_2)_4$—$NH_2$
—$CH_2CH(CH_3)CH_2$—$NH_2$
—$(CH_2)_3$—NH—$(CH_2)_2$—$NHCH_3$
—$(CH_2)_3$—NH—$(CH_2)_2$—$N(CH_3)_2$
—$(CH_2)_3$—NH—$(CH_2)_2$—$NHCH_2CH_3$
—$(CH_2)_3$—NH—$(CH_2)_2$—$N(CH_2CH_3)_2$
—$(CH_2)_3[$—NH—$CH_2CH_2]_2$—$NH_2$ and the partially or fully acetylated forms thereof, such as
—$(CH_2)_3$—NH(acetyl)
—$(CH_2)_3$—NH—$(CH_2)_2$—NH(acetyl), and
—$(CH_2)_3$—N(acetyl)-$(CH_2)_2$—NH(acetyl).

Preferred examples of radicals A are:
—$(CH_2)_3NH_2$
—$(CH_2)_3$—NH—$(CH_2)_2$—$NH_2$
—$CH_2CH(CH_3)CH_2$—NH—$(CH_2)_2$—$NH_2$
—$(CH_2)_3$—$NHCH_3$.

Preferably A is an amino radical of the formula $$-R^2-[NH-CH_2CH_2-]_{x'}-NH_2,$$

where
x' is 0 or 1 and
$R^2$ is a radical of the formula —$(CH_2)_3$— or —$CH_2$—$CH(CH_3)$—$CH_2$—.

Particularly preferred examples of radical A are
—$(CH_2)_3NH_2$
—$(CH_2)_3$—NH—$(CH_2)_2$—$NH_2$, and
—$CH_2CH(CH_3)CH_2$—NH—$(CH_2)_2$—$NH_2$.

Further examples of a aminoorganopolysiloxanes (1) are commercially customary functionalized siloxanes, such as amine oils, examples being amine oils having 3-(2-aminoethyl)aminopropyl functions, and also glycol oils, phenyl oils or phenylmethyl oils which contain amino groups.

In the production of the dispersions of the invention it is possible to use one kind of aminoorganopolysiloxane (1) or different kinds of aminoorganopolysiloxane (1).

The aminoorganopolysiloxanes (1) used in producing the dispersions of the invention preferably have viscosities of 1 mPa·s to 50 000 000 mPa·s at 25° C., more preferably 50 mPa·s to 10 000 000 mPa·s at 25° C. and very preferably 100 mPa·s to 500 000 mPa·s at 25° C.

The aminoorganopolysiloxanes (1) used in producing the dispersions of the invention may be prepared for example as described in U.S. Pat. No. 7,129,369 B2.

The dispersions of the invention preferably comprise precrosslinked organopolysiloxanes of the invention,
emulsifiers (3), and
water (4).

The dispersions of precrosslinked organopolysiloxanes of the invention may optionally be produced using further substances, which do not participate directly in the reaction.

On being dried—without addition of catalyst or change in pH—the dispersions of the invention form a silicone network, preferably an elastic silicone network. The dispersions of the invention preferably form elastomeric films following removal of the water.

In the process of the invention, the reaction of aminoorganopolysiloxanes (1) and optionally (1a) with reactive esters (2) in accordance with the invention, there are preferably no metal-containing catalysts also used.

The dispersions of the invention therefore preferably contain no catalysts.

In the production of the precrosslinked organopolysiloxanes of the invention, aminoorganopolysiloxanes (1) and reactive esters (2) are used, and these components react with one another preferably at room temperature. No metal-containing, additional catalysts are needed to support this reaction, and therefore preferably no transition metals from transition group VIII of the Periodic Table, and compounds thereof, and no metals from main groups III, IV and V of the Periodic Table, and compounds thereof, are used; in this definition, the elements C, Si, N, and P are not deemed to be metals.

Furthermore, the reaction proceeds preferably in the neutral range, i.e. in the pH range from around 4 to 8, which comes about as a result of the components themselves. As a result of the high reactivity, furthermore, there is no need for a targeted chemical reaction, and preferably not for any heating either.

In the production of the dispersions of the invention it is possible to use one kind of ester (2) as crosslinker or different kinds of esters (2) as crosslinkers.

Preferred esters (2) used are tartrates of the formula

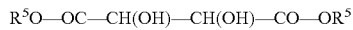

where $R^5$ has the definition indicated for it above, preferably a C14 alkyl radical, more particularly is a methyl or ethyl radical.

Preferred examples of esters (2) are therefore diethyl tartrates, such as diethyl L-tartrate, diethyl D-tartrate and meso diethyl tartrate and dimethyl tartrates, such as dimethyl L-tartrate, dimethyl D-tartrate and meso dimethyl tartrate, with particular preference being given to diethyl tartrates, such as diethyl L-tartrate.

Preferably, therefore, Y is a radical of the formula

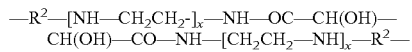

where is 0 or 1 and
$R^2$ is a radical of the formula —$(CH_2)_3$— or —$CH_2$—$CH(CH_3)$—$CH_2$—.

Depending on the use of crosslinker (2) or of linear, branched or resinlike aminoorganopolysiloxanes (1), the precrosslinked organopolysiloxanes may have branched or even highly branched or highly crosslinked structures with linear fractions.

In the process of the invention, the nature and amount of aminoorganopolysiloxanes and esters are selected such that in the resulting dispersions the organopolysiloxanes are precrosslinked.

Preferred aminoorganopolysiloxanes (1) used are those which contain on average at least one primary amino function in the pendant amino radicals A, thus giving precrosslinked organopolysiloxanes of the invention. In addition it is also possible to use aminoorganopolysiloxanes (1a), which contain only terminal amino radicals A with primary amino functions.

If aminoorganopolysiloxanes (1a) are used, they are used preferably in amounts of 10 to 300 parts by weight, per 100 parts by weight of aminoorganopolysiloxanes (1).

Furthermore, when using mixtures of aminoorganopolysiloxanes (1) and unfunctional organopolysiloxanes (1b), precrosslinked organopolysiloxanes of the invention are also obtained. Unfunctional organopolysiloxanes (1b) here are organopolysiloxanes without amino radicals A, preferably linear organopolysiloxanes of the general formula

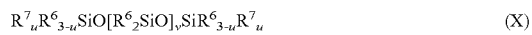 (X)

where $R^6$ has the definition of R and
$R^7$ has the definition of $R^6$ or is an HO— group,
u is 0 or 1, and
v is 0 or an integer from 1 to 2000.

Preferably $R^6$ is a monovalent $C_{1-18}$ hydrocarbon radical, more preferably a $C_{1-18}$ alkyl radical.

Examples of unfunctional organopolysiloxanes (1b) are dialkylpolysiloxanes, preferably dimethylpolysiloxanes.

If unfunctional organopolysiloxanes (1b) are used, they are used preferably in amounts of 100 to 800 parts by weight per 100 parts by weight of aminoorganopolysiloxanes (1).

The degree of crosslinking here is dependent on the ratio used for the equivalents —$OR^5$ of the reactive esters (2) to the amino radical A in the aminoorganopolysiloxane (1).

For producing the dispersions of the invention composed of aminoorganopolysiloxane (1) and reactive ester (2), the ester (2) here is used preferably in amounts of 0.6 to 10 equivalents of —$OR^5$, more preferably 0.65 to 2 equivalents of ~$OR^5$, very preferably 0.7 to 1.5 equivalents of —$OR^5$, per equivalent of amino radical A in the aminoorganopolysiloxane (1), where A and $R^5$ have the definition indicated for them above.

The dispersions of precrossklinked organopolysiloxanes of the invention are produced by intensive mixing of aminoorganopolysiloxanes (1) with esters (2), emulsifiers (3) and water (4) with one another. The production may take place batchwise or continuously.

The way in which the components used for producing the dispersions of the invention are mixed is not especially critical, and may be practiced in various orders. For example, components (1) and (2) may be premixed with one another, then the emulsifier (or emulsifiers) added, and thereafter water (4) incorporated. Another possibility is to meter components (1) to (4) in order into the emulsifying apparatus. In special cases it may be advantageous—for reason, for example, of the viscosity or reactivity of the aminoorganopolysiloxanes (1) and optionally (1a) unfunctional organopolysiloxanes (1b) employed—to mix esters (2) with an aminoorganopolysiloxane and thereafter to incorporate a different aminoorganopolysiloxane or unfunctional organopolysiloxane, or vice versa, depending on how more favorable rheological properties for the processing of the components are produced.

Furthermore, it is also possible to introduce the ester (2) as crosslinker into the completed emulsion of aminoorganopolysiloxanes (1), in order thereby to achieve the desired reaction and crosslinking of the aminoorganopolysiloxane in the emulsion. To obtain VOC-free products, these being products without volatile organic compounds, the byproduct alcohol $R^5OH$ (where $R^5$ has the definition indicated for it above) can be completely or partially removed by suitable known measures such as distillation, membrane techniques or other separation techniques.

In the production of the dispersions of the invention, water (4) is used in amounts of preferably 1 to 99 wt %, more preferably 25 to 95 wt %, based in each case on the total weight of all the ingredients of the dispersion.

The aqueous dispersion of precrosslinked organopolysiloxanes of the invention is used as an oil-in-water system.

As emulsifiers (3) for producing the aqueous dispersions of precrosslinked organopolysiloxanes it is possible to use all anionic, nonionic, cationic or amphoteric emulsifiers known to date, both individually and as mixtures of different emulsifiers, with which it has also been possible to date to produce aqueous dispersions, more particularly aqueous emulsions of organopolysiloxanes.

Examples of anionic emulsifiers are as follows:

1. alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) and/or propylene oxide (PO) units.
2. Sulfonates, particularly alkylsulfonates having 8 to 18 carbon atoms, alkylarylsulfonates having 8 to 18 carbon atoms, taurides, esters and monoesters of sulfosuccinic acid with monohydric alcohols or alkylphenols having 4 to 15 carbon atoms; these alcohols or alkylphenols may optionally also be ethoxylated with 1 to 40 EO units.
3. Alkali metal salts and ammonium salts of carboxylic acids having 8 to 20 carbon atoms in the alkyl, aryl, alkaryl or aralkyl radical.
4. Partial esters of phosphoric acid and the alkali metal salts and ammonium salts of said esters, particularly alkyl and alkaryl phosphates having 8 to 20 carbon atoms in the organic radical, alkyl ether phosphates and alkaryl ether phosphates having 8 to 20 carbon atoms in the alkyl or alkaryl radical and 1 to 40 EO units.

Examples of nonionic emulsifiers are as follows:

5. Polyvinyl alcohol additionally containing 5% to 50%, preferably 8% to 20%, of vinyl acetate units, having a degree of polymerization of 500 to 3000.
6. Alkyl polyglycol ethers, preferably those having 3 to 40 EO units and alkyl radicals of 8 to 20 carbon atoms.
7. Alkylaryl polyglycol ethers, preferably those having 5 to 40 EO units and 8 to 20 carbon atoms in the alkyl and aryl radicals.
8. Ethylene oxide/propylene oxide (EO/PO) block copolymers, preferably those having 8 to 40 EO and/or PO units.
9. Adducts of alkylamines having alkyl radicals of 8 to 22 carbon atoms with ethylene oxide or propylene oxide.
10. Fatty acids having 6 to 24 carbon atoms.
11. Alkylpolyglycosides of the general formula R"—O—$Z_O$, in which R" is a linear or branched, saturated or unsaturated alkyl radical having on average 8-24 carbon atoms and $Z_O$ is an oligoglycoside radical having on average o=1-10 hexose or pentose units or mixtures thereof.
12. Natural substances and derivatives thereof, such as lecithin, lanolin, saponins, cellulose; cellulose alkyl ethers and carboxyalkylcelluloses, the alkyl groups of which possess in each case up to 4 carbon atoms.
13. Linear organo(poly)siloxanes containing polar groups containing, in particular the elements O, N, C, S, P and/or Si, more particularly those siloxanes having alkoxy groups with up to 24 carbon atoms and/or up to 40 EO and/or PO groups.

Examples of cationic emulsifiers are as follows:

14. Salts of primary, secondary and tertiary fatty amines having 8 to 24 carbon atoms with acetic acid, sulfuric acid, hydrochloric acid and phosphoric acids.
15. Quaternary alkyl ammonium and alkylbenzene ammonium salts, more particularly those whose alkyl groups possess 6 to 24 carbon atoms, more particularly the halides, sulfates, phosphates and acetates.
16. Alkylpyridinium, alkylimidazolinium and alkyloxazolinium salts, more particularly those whose alkyl chain possesses up to 18 carbon atoms, especially the halides, sulfates, phosphates and acetates.

Particularly suitable amphoteric emulsifiers are as follows:

17. Amino acids with long-chain substitution, such as N-alkyl-di(aminoethyl)glycine or N-Alkyl-2-aminopropionic acid salts.
18. Betaines, such as N-(3-acylamidopropyl)-N,N-dimethylammonium salts with a $C_8$-$C_{18}$ acyl radical, and alkylimidazolium betaines, or quaternized alkyl or substituted alkyl derivatives of N,N-dimethylglycine.

Preferred emulsifiers for producing organopolysiloxanes precrosslinked for aqueous dispersions are nonionic emulsifiers, more particularly the alkyl polyglycol ethers listed under 6. above.

Constituent (3) may consist of one of the above-stated emulsifiers or a mixture of two or more above-stated emulsifiers; it can be used in pure form or in the form of solutions of one or more emulsifiers in water or organic solvents.

In the production of the dispersions of the invention, the emulsifiers (3) are used in amounts of preferably 0.1 to 60 wt %, more preferably 0.5 to 30 wt %, based in each case on the total weight of aminoorganopolysiloxanes (1) and ester (2).

If the aminoorganopolysiloxane (1) or the ester (2), or the precrosslinked organopolysiloxane that is formed itself, acts as an emulsifier, there is no need to add separate emulsifier (3).

The emulsifying procedure for producing the dispersion is carried out preferably at temperatures below 120° C., more preferably at 5° C. to 100° C., very preferably at 10° C. to 80° C. The increase in temperature comes about preferably through the introduction of mechanical shearing energy which is needed for the emulsifying operation. The increase in temperature is not needed in order to accelerate a chemical operation. Moreover, the dispersions are produced preferably under the pressure of the surrounding atmosphere, but may also be carried out at higher or lower pressures.

The reaction of aminoorganopolysiloxanes (1) with esters (2) in the production of the dispersions proceeds preferably in a few minutes to several days.

The alcohols obtained as condensation byproducts in the production of the dispersions may remain in the product or else be removed, by vacuum distillation, membrane techniques, or by extraction, for example.

The mean particle size measured by light scattering in the dispersions of the invention is preferably in the 0.001 to 50 μm range, more preferably 0.005 to 20 μm, very preferably in the 0.01 to 10 μm range.

The pH values may vary from 1 to 14, preferably 3 to 9, more preferably 4 to 8.

A subject of the invention are cosmetic compositions comprising aqueous dispersions, preferably aqueous emulsions, of precrosslinked organopolysiloxanes, according to the invention.

The cosmetic composition of the invention comprises aqueous dispersions of precrosslinked organopolysiloxanes preferably in amounts of 0.2 to 65 wt %, more preferably of 0.5 to 50 wt %, based in each case on the total weight of the cosmetic composition.

The cosmetic compositions of the invention preferably comprise water as cosmetically acceptable medium.

The cosmetic composition of the invention preferably comprises a conditioning agent. The term conditioning agents is used, in analogy to K. Krummel, Stephane Chiron, J. Jachowicz, Chapter 14, in: "The Chemistry and Manufacture of Cosmetics", volume II, Formulating, Third Edition by Mitchell L. Schlossmann, 2000, pp. 359-396, to refer to cosmetic ingredients which modify a hair surface and influence the condition of the hair. Cosmetic compositions comprising conditioning agents are employed in order to modify or improve the softness of the hair, greater ease of disentangling, reduction in wet and dry combing force, care of the hair, prevention of electrostatic charging, easier sliding effect through the hair and along the hair surface, improvement in hair shine, retention of color fastness of hair, reduction in hair breakage, retention of hair shape, and further cosmetic properties which are associated with natural and healthy hair.

The cosmetic composition of the invention improves one or more of the effects stated above, especially the combability and the deposition of the silicone on the hair.

Examples of conditioning agents and their INCI names are described in the "International Cosmetic Ingredient Dictionary & Handbook" of the Personal Care Product Council (ed.). For reference it is possible to use the World Wide Web-based "wINCI Web Based International Cosmetic Ingredient Dictionary & Handbook or the International Cosmetic Ingredient Dictionary & Handbook, 13th Edition, The Personal Care Products Council (formerly: The Cosmetic, Toiletry, and Fragrance Association (CTFA)), 2010.

Conditioning agents used are preferably those selected from the group of
  cationic polymers,
  cationic surfactants,
  nonpolymeric quaternary ammonium compounds,
  organopolysiloxanes and organopolysiloxane copolymers different from the precrosslinked organopolysiloxanes containing structural units of the formula (I),
    fatty acid esters and fatty acid alcohols,
    natural or synthetic oils and waxes, and
    panthenol, lipids, proteins and hydrolyzed proteins,
    and also mixtures of these.

Preferred examples of conditioning agents are cationic polymers. These are understood as meaning polymers which, pendantly or terminally, carry cationic groups or, pendantly or terminally, carry groups which can be converted into a cationic group by ionization. Preference is given to using cationic polymers which have a quaternary ammonium group.

Examples of cationic polymers preferably employed are published in the International Cosmetic Ingredient Dictionary & Handbook under the designation Polyquaternium, with each polymer being identified by an individual numerical abbreviation—for example, Polyquaternium-1.

Further examples of cationic polymers are quaternary ammonium group-containing derivatives of modified polysaccharides, e.g. polymers having the INCI name *Cassia* hydroxypropyltrimonium chloride, derivatives of modified cellulose and/or starch, e.g. a quaternary ammonium derivative of a propylene glycol ether-modified *Cyamopsis Tetragonoloba* (guar) gum with the INCI name Guar Hydroxypropyltrimonium Chloride, or polymeric quaternary ammonium salts of the reaction product of hydroxyethylcellulose with a trimethylammonium-substituted epoxide, such as Cellulose, 2-Hydroxyethyl 2-(2-Hydroxy-3-(Trimethylammonium)Propoxy)Ethyl 2-Hydroxy-3-(Trimethylammonio)Propyl Ether Chloride, such as Cellulose, 2-Hydroxyethyl 2-Hydroxy-3-(Trimethylammonium)Propyl Ether, Chloride, such as Cellulose, 2-Hydroxyethyl 23-Hydroxy-3-(Trimethylammonium)Propyl Ether chloride, such as Cellulose, 2-[2-Hydroxy-3-(Trimethylammonium) Propoxy]Ethyl Ether, Chloride, such as Cellulose, 2-[2-Hydroxy-3-Trimethylammonium)propoxy] Ethyl ether chloride with the INCI name Polyquaternium-10.

Further examples of cationic polymers are quaternary ammonium group-containing acrylic acid polymer derivatives, acrylic acid copolymer derivatives, methacrylic acid derivatives and methacrylic acid copolymer derivatives, examples being polymers with the INCI name Polyquaternium-37.

Further examples of cationic polymers are quaternary ammonium group-containing copolymers of dimethyldiallylammonium chloride and acrylic acid, examples being polymers with the INCI name Polyquaternium-22.

Further examples of cationic polymers are quaternary ammonium group-containing copolymers of derivatives of vinylpyrrolidone, vinylimidazole and vinylimidazoline and methacrylic acid, examples being polymers with the INCI name Polyquaternium-86.

Further examples of cationic polymers are quaternary ammonium group-containing polymers of acrylamide and dimethyldiallylammonium chloride, examples being polymers with the INCI name Polyquaternium-7.

Further examples of cationic polymers are quaternary ammonium group-containing copolymers of the reaction product of diethyl sulfate with vinylpyrrolidone and dimethylaminoethyl methacrylate, examples being polymers with the INCI name Polyquaternium-11.

If cationic polymers are used, the cosmetic composition of the invention contains cationic polymers preferably in amounts of 0.01 to 5 wt %, more preferably of 0.05 to 4 wt %, especially preferably 0.10 to 3 wt %, based in each case on the total weight of the cosmetic composition.

Further preferred examples of conditioning agents are cationic surfactants. Examples of cationic surfactants preferably used correspond to the materials listed in sections 14. to 16. under examples of cationic emulsifiers.

Examples are cetyl trimethylammonium salts or behenyl trimethylammonium salts. The anionic counterion present may be, for example, chloride, bromide, methosulfate. INCI names of cationic surfactants preferably used are, for example, Cetrimonium Chloride, Cetrimonium Methosulfate, Behentrimonium Chloride, Behentrimonium Methosulfate, Steartrimonium Bromide.

If cationic surfactants are used, the cosmetic composition of the invention comprises cationic surfactants preferably in amounts of 0.1 to 7 wt %, more preferably of 0.15 to 6 wt %, especially preferably 0.2 to 5 wt %, based in each case on the total weight of the cosmetic composition.

Further examples of conditioning agents are nonpolymeric quaternary ammonium compounds. This term refers to nonpolymeric ammonium compounds which are present in cationic form or can be converted into a cationic group by ionization.

Examples of nonpolymeric quaternary ammonium compounds preferably used are Dimethyl Dioctadecyl Ammonium Chloride with the INCI name Distearyldimonium Chloride, N-[3-(dimethylamino)propyl]octadecaneamide with the INCI name Stearamidopropyl Dimethylamine, or compounds with the INCI name Dicocoylethyl Hydroxyethylmonium Methosulfate or Quaternium-87.

Further preferred examples of conditioning agents are organopolysiloxanes and organopolysiloxane copolymers which are different from the precrosslinked organopolysiloxanes having structural units of the formula (I) that are present in the aqueous dispersions. The organopolysiloxanes may be present in the form of an oil, wax, gum or resin or in the form of an emulsion.

Examples of such organopolysiloxanes different from the precrosslinked organopolysiloxanes with structural units of the formula (I) are as follows:

cyclic organopolysiloxanes of the formula $$[R^*_2SiO]_x$$

where x is an integer from 4 to 8,
linear organopolysiloxanes of the general formula $$R^*_3SiO[R^*_2SiO]_ySiR^*_3 \text{ or}$$

$$HOSiR^*_2O[R^*_2SiO]_ySiR^*_2OH,$$

where y is 0 or an integer from 1 to 2000, and resinlike organopolysiloxanes of the general formula $$R^*_tSiO_{(4-t)/2}$$

where R* has in each case the definition of R, $R^1$ or A, preferably of R and $R^1$, indicated for them above, and
t is 0, 1, 2 or 3,
and so the organopolysiloxane resin is constructed of M, D, T and/or Q units, with preference being given both to a combination primarily or exclusively of D and T units and to a combination primarily or exclusively of M and Q units; in the case of the resins constructed primarily or exclusively of D and T units, T units are present preferably in a molar ratio of T/[M+D+T+Q] of 0.45 to 1, more preferably of 0.55 to 1.0, and the number of the M and Q units in both cases is preferably zero, and, in the case of the organopolysiloxane resins constructed primarily or exclusively of M and Q units, Q units are present preferably in a molar ratio of Q/[M+D+T+Q] of 0.25 to 0.9, more preferably of 0.35 to 0.7, and the number of the D and T units in both cases is preferably zero.

Examples of organopolysiloxanes, present in the form of an oil, are polydimethylsiloxanes having the viscosity 0.65 to 2 000 000 mPas (25° C.) and the INCI designations Disiloxane and Dimethicone.

Further examples of organopolysiloxanes present in the form of an oil or wax are functionalized organopolysiloxanes, examples being polyalkysiloxanes where at least one alkyl radical is different from methyl, examples being organopolysiloxanes with the INCI name Stearyl Dimethicone, Cetyl Dimethicone or C26-28 Alkyl Dimethicone, or, for example, polyarylsiloxanes and polyarylalkylsiloxanes, examples being organopolysiloxanes with the INCI name Phenyl Trimethicone, Trimethylsiloxyphenyl Dimethicone or Dimethylphenyl Dimethicone, or, for example, Organopolysiloxanes having an organo-functional radical such as an aminopropyl, aminopropyl-aminoethyl, aminopropyl-aminoisobutyl radical, examples being organopolysiloxanes with the INCI name Amodimethicone, or, for example, Organopolysiloxanes having a polyethylene glycol or polyalkylene glycol radical, examples being organopolysiloxanes having the INCI name PEG-12 Dimethicone, PEG/PPG-25,25-Dimethicone or Cetyl PEG/PPG-15/15 Butyl Ether Dimethicone.

Further examples of organopolysiloxanes are silicone resins having the INCI names Trimethylsiloxysilicate or Polymethylsilsesquioxane.

If such organopolysiloxanes or organopolysiloxane copolymers are used, the cosmetic composition of the invention comprises organopolysiloxanes and organopolysiloxane copolymers which are different from the precrosslinked organopolysiloxanes having structural units of the formula (I) that are present in the aqueous dispersions in amounts, preferably, of 0.1 to 40 wt %, more preferably of 0.2 to 30 wt %, especially preferably 0.3 to 20 wt %, based in each case on the total weight of the cosmetic composition.

Further preferred examples of conditioning agents are fatty acid esters and fatty acid alcohols.

Examples of fatty acid alcohols are alcohols with C8-C28 carbon chains, such as the fatty alcohols 1-octadecanol with the INCI name Stearyl Alcohol, 1-hexadecanol with the INCI name Cetyl Alcohol, or fatty alcohols with the INCI names Cetearyl Alcohol, Myristyl Alcohol, Caprylic Alcohol, Lauryl Alcohol, Decyl Alcohol and Oleyl Alcohol.

In addition to conditioning properties, fatty acid alcohols also fulfil a structuring, thickening effect in cosmetic compositions.

Further examples of fatty acid esters are esters of the fatty acids with the INCI name Palmitic Acid, Oleic Acid, Linolic Acid, Linoleic Acid, Caprylic Acid, Myristic Acid, Stearic Acid, examples being fatty acid esters with the INCI name Isopropyl Palmitate, Ethylhexyl Palmitate, Isopropyl Myristate, Isopropyl Stearate.

If fatty acid esters and fatty acid alcohols are used, the cosmetic composition of the invention comprises fatty acid esters and fatty acid alcohols preferably in amounts of 0.1 to 15 wt %, more preferably of 0.3 to 12 wt %, especially preferably 0.5 to 10 wt %, based in each case on the total weight of the cosmetic composition.

Further preferred examples of conditioning agents are natural or synthetic oils and waxes.

Examples of preferred oils and waxes are hydrocarbons with linear or branched, saturated or unsaturated C4-C60 carbon chains, such as oils and waxes with the INCI names Isododecane, hydrated Polyisobutylene, hydrated Polydecene, Paraffin and Isoparaffin.

Further examples of preferred oils and waxes are carnauba wax, beeswax, wool wax, microcrystalline wax, jojoba oil, rice oil, calendula oil, sunflower oil, soybean oil, coconut oil, olive oil and almond oil.

If natural or synthetic oils and waxes are used, the cosmetic composition of the invention comprises oils and waxes preferably in amounts of 0.1 to 10 wt %, more preferably 0.2 to 7 wt %, especially preferably 0.3 to 5 wt %, based in each case on the total weight of the cosmetic composition.

Further preferred examples of conditioning agents are panthenol, lipids, such as ceramides, proteins and hydrolyzed proteins, such as hydrolyzed collagen, hydrolyzed wheat proteins and hydrolyzed silk.

The cosmetic composition optionally comprises further cosmetically customary additives, such as, for example, surfactants, thickeners, gelling agents, film formers, moisturizing agents, UV filters, pearlescent pigments, vitamins, antioxidants, caffeine, active antidandruff ingredients or preservatives.

Examples of further additives customary in cosmetology and their INCI names are described in the "International Cosmetic Ingredient Dictionary & Handbook" of the Personal Care Product Council.

The cosmetic composition optionally comprises further cosmetically customary additives such as surfactants.

Examples of surfactants customary in cosmetology are also described in K. Schrader, A. Domsch, Cosmetology—Theory and Practice, volume II, pages 11-8 to 11-22, Verlag für chemische Industrie, 2005, and also in sections 1. to 18. under examples of emulsifiers.

Examples of anionic surfactants preferably used correspond to the materials listed in sections 1. to 3. under examples of anionic emulsifiers.

INCI names of anionic surfactants preferably used are, for example, Sodium Lauryl Sulfate, Ammonium Laureth Sulfate, Sodium Laureth Sulfate, Disodium 2-Sulfolaurate, Disodium Lauryl Sulfosuccinate or Disodium Laureth-Sulfosuccinate.

If anionic surfactants are used, the cosmetic composition of the invention comprises anionic surfactants preferably in amounts of 1 to 30 wt %, more preferably of 5 to 25 wt %, especially preferably 7 to 20 wt %, based in each case on the total weight of the cosmetic composition.

Examples of nonionic surfactants preferably used correspond to the materials listed in sections 5. to 13. under examples of nonionic emulsifiers.

INCI names of nonionic surfactants preferably used are, for example, Coco Glucoside, Lauryl glucoside, Decyl Glucoside, PEG-40 Hydrogenated Castor Oil, Polysorbate 80 or PEG-7 Glyceryl Cocoate.

If nonionic surfactants are used, the cosmetic composition of the invention comprises nonionic surfactants preferably in amounts of 1 to 15 wt %, more preferably of 2 to 12 wt %, especially preferably 3 to 10 wt %, based in each case on the total weight of the cosmetic composition.

Examples of amphoteric surfactants preferably used correspond to the materials listed in sections 17. to 18. under examples of nonionic emulsifiers. Further preferred examples are compounds from the classes of the alkylamidobetaines, alykylamphoacetates and alkylamphopropionates. INCI names of nonionic surfactants preferably used are, for example, Cocamidopropyl Betaine, Cetyl Betaine, Cocamide MEA, Cocamide DEA, Cocamide MIPA, Sodium Cocoamphoacetate and Sodium Cocoamphopropionate.

If amphoteric surfactants are used, the cosmetic composition of the invention comprises amphoteric surfactants preferably in amounts of 1 to 15 wt %, more preferably of 2 to 12 wt %, especially preferably 3 to 10 wt %, based in each case on the total weight of the cosmetic composition.

The cosmetic composition optionally comprises further cosmetic customary additives such as thickeners.

Examples of thickeners preferably used are modified polysaccharides such as starch, cellulose, gum arabic and guar gums, examples being polymers with the INCI name Cellulose Gum, Guar Gum, Xanthan Gum or *Cassia* Gum.

Further examples of thickeners are hydrophobically modified nonionic cellulose derivatives, an example being the cellulose derivative with the INCI name Hydroxyethylcellulose.

Further examples of thickeners are crosslinked acrylic acid and methacrylic acid polymers and derivatives of the crosslinked acrylic acid and methacrylic acid polymers, examples being polymers with the INCI name Carbomer.

Further examples of thickeners are agents which achieve a thickening effect in combination with surfactants. Examples are monoglycerides of fatty acids, mono/diglycerides of ethoxylated fatty acids, and ethoxylated fatty alcohols. INCI names of thickeners preferably used which achieve a thickening effect in combination with surfactants are PEG-120 Methyl Glucose Dioleate, PEG-150 Distearate, Myristyl Glycol, PEG-200 Glyceryl Palmitate, Laureth-4 or PEG-200 Glyceryl Palmitate.

Further examples of thickeners are salts, examples being salts with the INCI name Sodium Chloride.

If thickeners are used, the cosmetic composition of the invention comprises thickeners preferably in amounts of 0.1 to 10 wt %, based in each case on the total weight of the cosmetic composition.

The cosmetic composition optionally comprises further cosmetically customary additives such as film formers.

Preferred examples of film formers are polymers.

Examples of film-forming polymers preferably used are described in the "International Cosmetic Ingredient Dictionary & Handbook" of the Personal Care Product Council.

Examples of preferred film-forming polymers are acrylic acid polymer derivatives, acrylic acid copolymer derivatives, methacrylic acid derivates and methacrylic acid copolymer derivatives. Examples of preferred anionic polymers are copolymers of vinyl acetate and one or more acrylic acid monomers, methacrylic acid monomers and esters thereof, examples being polymers with the INCI name Acrylates/VA Copolymer.

Further examples of preferred film-forming polymers are copolymers of vinylpyrrolidone and one or more acrylic acid monomers, methacrylic acid monomers and esters thereof, examples being polymers with the INCI name Acrylates/VP Copolymer.

Further examples of preferred film-forming polymers are copolymers of tert-butylacrylamide and one or more acrylic acid monomers, methacrylic acid monomers and esters thereof, examples being polymers with the INCI name Acrylates/t-Butylacrylamide Copolymer.

Further examples of preferred film-forming polymers are copolymers of vinyl acetate, crotonic acid and vinyl neodecanoate monomers, examples being polymers with the INCI name VA/Crotonates/Vinyl Neodecanoate Copolymer.

Further examples of preferred film-forming polymers are copolymers of vinyl acetate, crotonic acid and vinyl neodecanoate monomers and vinyl silicones, examples being polymers with the INCI name Crotonic Acid/Vinyl C8-C12 Isoalkyl Esters/VA/Bis-Vinyldimethicone Copolymer.

If film-forming polymers are used, the cosmetic composition of the invention comprises film-forming polymers preferably in amounts of 0.1 to 15 wt %, more preferably 0.2 to 10 wt %, especially preferably 0.3 to 7 wt %, based in each case on the total weight of the cosmetic composition.

The cosmetic composition optionally comprises further cosmetically customary additives such as moisturizing agents.

Examples of moisturizing agents preferably used are glycerol, sorbitol, xylitol, polyethylene glycol, 1,2-propanediol, 1,3-propanediol or polypropylene glycol.

If moisturizing agents are used, the cosmetic composition of the invention comprises moisturizing agents preferably in amounts of 0.1 to 10 wt %, more preferably 0.2 to 8 wt %, especially preferably 0.3 to 6 wt %, based in each case on the total weight of the cosmetic composition.

The cosmetic composition optionally comprises further cosmetically customary additives such as pearlizing agents.

Examples of pearlizing agents preferably used are pearlescent pigments or glycol distearate.

If agents imparting pearly luster are used, the cosmetic composition of the invention comprises agents imparting pearly luster preferably in amounts of 0.1 to 7 wt %, more preferably of 0.2 to 6 wt %, especially preferably 0.3 to 5 wt %, based in each case on the total weight of the cosmetic composition.

The cosmetic compositions are produced preferably by mixing at least one aqueous dispersion of precrosslinked organopolysiloxanes according to the invention with optionally at least one conditioning agent and optionally further cosmetically customary additives in a cosmetically acceptable medium, preferably water.

The individual ingredients may be mixed with one another in a hot/hot, hot/cold or cold/cold process.

In the production of the cosmetic composition of the invention, the dispersions of precrosslinked organopolysiloxanes according to the invention are added preferably at temperatures of at most 50° C., more preferably at temperatures of at most 40° C., very preferably at temperatures of at most 35° C. They are added preferably at temperatures of at least 5° C., more preferably at temperatures of at least 10° C.

The cosmetic composition of the invention may be present in the form of an emulsion, a suspension, a solution, a cream, a lotion, a mousse, a stick, a soap bar, a paste, or a gel.

The cosmetic composition of the invention in the form of an emulsion may be present in the form of a W/O emulsion (water-in-oil emulsion), an O/W emulsion (oil-in-water emulsion) or as a multiple emulsion.

If the aim is to produce a cosmetic composition comprising aqueous dispersion of precrosslinked organopolysiloxanes according to the invention in the form of an emulsion with translucent or transparent appearance, then preference is given to using aqueous dispersions of precrosslinked organopolysiloxanes according to the invention having particle sizes <700 nm, more preferably having particle sizes <400 nm, especially preferably having particle sizes <300 nm.

A further subject of the invention is the use of the cosmetic composition of the invention for treating keratinic fibers, such as hair. The cosmetic compositions are used preferably for cleansing and caring for keratinic fibers, such as hair.

Examples of products for the cleansing and care of hair are hair shampoos, hair rinses (rinse-off conditioners), hair treatments, hair masks, hair sera, hair mousses, hair styling sprays, hair creams, hair gels, hair oils, hair end fluids and hair colorants.

A further subject of the invention is the use of the cosmetic composition of the invention for conditioning keratinic fibers, such as hair, for the purpose more particularly of facilitating combability.

A further subject of the invention is a method for treating keratinic fibers, preferably hair, by applying the cosmetic compositions of the invention to the keratinic fibers, preferably hair, and then optionally rinsing with water.

In the examples described below, all data for parts and percentages, unless otherwise indicated, are based on the weight. Furthermore, all viscosity data are based on a temperature of 25° C. Unless otherwise indicated, the examples below are carried out at a pressure of the surrounding atmosphere, in other words about 1020 hPa, and at room temperature, in other words, at about 20° C., or at a temperature which comes about when the reactants are combined at room temperature without additional heating or cooling.

Production of Aminosilicone Oil Emulsions E1-E7:

Production of Aminosilicone Oil Emulsion E1:

Using an Ultra-Turrax T 50 emulsifier (from Janke & Kunkel/IKA), at 4000 rpm, 4.9 g of a 80% aqueous solution of isotridecyl decaethoxylate, available commercially under the tradename Lutensol TO 10 (from BASF), and 1.4 g of fully demineralized water are premixed. 34.8 g of a hydroxy/methoxy-terminated copolymer composed of 3-(2-aminoethylamino)propyl-methylsiloxy and dimethylsiloxy units, having an amine number of 0.13 and a viscosity of 4000 mm$^2$/s (at 25° C.), are added in three portions with shearing at 4000 rpm, to form a relatively firm, stiff phase as a preliminary emulsion. This emulsion is diluted with 57.8 g of fully demineralized water in portions, with gentle shearing, to form the desired emulsion, and 0.20 g of 80% acetic acid and 0.9 g of 2-phenoxyethanol are added. The product is a smooth white silicone oil emulsion of low viscosity, having a solids content of 40% and a pH of 5. The particle size distribution is monomodal, with a D50 of 110 nm. The emulsion is still uniform and stable after 4-week storage at 50° C.

Production of Aminosilicone Oil Emulsion E2:

Using an Ultra-Turrax T 50 emulsifier (from Janke & Kunkel/IKA), at 4000 rpm, 5.5 g of a 80% aqueous solution of isotridecyl decaethoxylate, available commercially under the tradename Lutensol TO 10 (from BASF), and 5.5 g of fully demineralized water are premixed. 34.8 g of a hydroxy/methoxy-terminated copolymer composed of 3-(2-aminoethylamino)propyl-methylsiloxy and dimethylsiloxy units, having an amine number of 0.25 and a viscosity of 4000 mm$^2$/s (at 25° C.), are added in three portions with shearing at 4000 rpm, to form a relatively firm, stiff phase as a preliminary emulsion. This emulsion is diluted with 53.0 g of fully demineralized water in portions, with gentle shearing, to form the desired emulsion, and 0.25 g of 80% acetic acid and 0.9 g of 2-phenoxyethanol are added. The product is a smooth white silicone oil emulsion of low viscosity, having a solids content of 40% and a pH of 6.5. The particle size distribution is bimodal, with a D50 of 110 nm. The emulsion is still uniform and stable after 4-week storage at 50° C.

Production of Aminosilicone Oil Emulsion E3:

Using an Ultra-Turrax T 50 emulsifier (from Janke & Kunkel/IKA), at 4000 rpm, a mixture of 1.5 g of isotridecyl pentaethoxylate, available commercially under the tradename Lutensol TO 5 (from BASF), 3.0 g of isotridecyloctaethoxylate available commercially under the tradename Lutensol TO 8, and 5.0 g of fully demineralized water are premixed. 26.1 g of a trimethylsilyl-terminated copolymer composed of 3-(2-aminoethylamino)propyl-methylsiloxy and dimethylsiloxy units, having an amine number of 0.6 and a viscosity of 1000 mm$^2$/s (at 25° C.), are added in three portions with shearing at 4000 rpm, to form a relatively firm, stiff phase as a preliminary emulsion. This emulsion is diluted with 62.7 g of fully demineralized water in portions, with gentle shearing, to form the desired emulsion, and 0.75 g of 80% acetic acid and 0.9 g of 2-phenoxyethanol are added.

The product is a smooth partially transparent bluish silicone oil emulsion of low viscosity, having a solids content of 31.5% and a pH of 6.5.

The particle size distribution is monomodal, with a D50 of 56 nm. The emulsion is still uniform and stable after 4-week storage at 50° C.

Production of Aminosilicone Oil Emulsion E4:

Using an Ultra-Turrax T 50 emulsifier (from Janke & Kunkel/IKA), at 4000 rpm, 5.5 g of a 80% aqueous solution of isotridecyl decaethoxylate, available commercially under the tradename Lutensol TO 10 (from BASF), and 5.5 g of fully demineralized water are premixed. A mixture of 12.6 g of a hydroxy/methoxy-terminated copolymer composed of 3-(2-aminoethylamino)propyl-methylsiloxy and dimethylsiloxy units, having an amine number of 0.13 and a viscosity of 4000 mm$^2$/s (at 25° C.) and 22.2 g of a trimethylsilyl-terminated polydimethylsiloxane having a viscosity of 60 000 mm$^2$/s (at 25° C.) are added in three portions with shearing at 4000 rpm, to form a relatively firm, stiff phase as a preliminary emulsion. This emulsion is diluted with 53.2 g of fully demineralized water in portions, with gentle shearing, to form the desired emulsion, and 0.08 g of 80% acetic acid and 0.9 g of 2-phenoxy-ethanol are added.

The product is a smooth white silicone oil emulsion of low viscosity, having a solids content of 40% and a pH of 5.

The particle size distribution is bimodal, with a D50 of 219 nm. The emulsion is still uniform and stable after 4-week storage at 50° C.

Production of Aminosilicone Oil Emulsion E5:

Using an Ultra-Turrax T 50 emulsifier (from Janke & Kunkel/IKA), at 4000 rpm, 5.5 g of a 80% aqueous solution of Isotridecyl decaethoxylate, available commercially under the tradename Lutensol TO 10 (from BASF), and 5.5 g of fully demineralized water are premixed. A mixture of 10.2 g of a trimethylsilyl-terminated copolymer composed of 3-(2-aminoethylamino)propyl-methylsiloxy and dimethylsiloxy units, having an amine number of 0.6 and a viscosity of 2100 mm$^2$/s (at 25° C.) and 24.6 g of a trimethylsilyl-terminated polydimethylsiloxane having a viscosity of 60 000 mm$^2$/s (at 25° C.) are added in three portions with shearing at 6000 rpm, to form a relatively firm, stiff phase as a preliminary emulsion. This emulsion is diluted with 53.0 g of fully demineralized water in portions, with gentle shearing, to form the desired emulsion, and 0.30 g of 80% acetic acid and 0.9 g of 2-phenoxy-ethanol are added.

The product is a smooth white silicone oil emulsion of low viscosity, having a solids content of 40% and a pH of 5. The particle size distribution is monomodal, with a D50 of 186 nm. The emulsion is still uniform and stable after 4-week storage at 50° C.

Production of Aminosilicone Oil Emulsion E6:

Using an Ultra-Turrax T 50 emulsifier (from Janke & Kunkel/IKA), at 4000 rpm, 5.5 g of a 80% aqueous solution of isotridecyl decaethoxylate, available commercially under the tradename Lutensol TO 10 (from BASF), and 5.5 g of fully demineralized water are premixed. A mixture of 17.1 g of a trimethylsilyl-terminated copolymer composed of 3-(2-aminoethylamino)propyl-methylsiloxy and dimethylsiloxy units, having an amine number of 0.6 and a viscosity of 2100 mm$^2$/s (at 25° C.) and 17.7 g of a trimethylsilyl-terminated polydimethylsiloxane having a viscosity of 60 000 mm$^2$/s (at 25° C.) are added in three portions with shearing at 6000 rpm, to form a relatively firm, stiff phase as a preliminary emulsion. This emulsion is diluted with 52.8 g of fully demineralized water in portions, with gentle shearing, to form the desired emulsion, and 0.49 g of 80% acetic acid and 0.9 g of 2-phenoxy-ethanol are added.

The product is a smooth white silicone oil emulsion of medium viscosity, having a solids content of 40% and a pH of 5. The particle size distribution is multimodal, with a D50 of 171 nm. The emulsion is still uniform and stable after 4-week storage at 50° C.

Production of Aminosilicone Oil Emulsion E7:

Using an Ultra-Turrax T 50 emulsifier (from Janke & Kunkel/IKA), at 4000 rpm, 5.5 g of a 80% aqueous solution of Isotridecyl decaethoxylate, available commercially under the tradename Lutensol TO 10 (from BASF), and 5.5 g of fully demineralized water are premixed. A mixture of 17.4 g of a copolymer composed of hydroxy/methoxy-terminated 3-(2-aminoethylamino)propyl-methylsiloxy and dimethylsiloxy units, having an amine number of 0.13 and a viscosity of 4000 mm$^2$/s (at 25° C.) and 17.4 g of a (3-aminopropyl) dimethylsilyl-terminated polydimethylsiloxane having an amine number of 0.04 and a viscosity of 13 100 mPas (at 23° C.) are added in three portions with shearing at 6000 rpm, to form a relatively firm, stiff phase as a preliminary emulsion. This emulsion is diluted with 53.2 g of fully demineralized water in portions, with gentle shearing, to form the desired emulsion, and 0.23 g of 80% acetic acid and 0.9 g of 2-phenoxyethanol are added.

The product is a smooth white silicone oil emulsion of low viscosity, having a solids content of 40% and a pH of 5.

The particle size distribution is bimodal, with a D50 of 115 nm. The emulsion is still uniform and stable after 4-week storage at 50° C.

EXAMPLES 1-6

Examples 1-6 below represent production processes for the synthesis of aqueous dispersions of precrosslinked organopolysiloxanes according to the invention, which are used for producing cosmetic compositions of the invention.

Example 1: Emulsion B1

Using an Ultra-Turrax T 50 emulsifier (from Janke & Kunkel/IKA), at 5000 rpm, 98.9 g of the aminosilicone oil emulsion E1 are homogenized with 1,1 g of diethyl L-tartrate over the course of a minute.

This gives a smooth white silicone oil emulsion B1 of low viscosity, having a solids content of 41% and a pH of 5. The particle size distribution is monomodal with a D50 of 110 nm. The emulsion is still uniform and stable after 4-week storage at 50° C.

Evaporation of the emulsion produces, after a drying time of 24 hours at 25° C., a white-opaque, gelatinous film which has a tacky surface and adheres weakly to glass and aluminum.

Example 2: Emulsion B2

Using an Ultra-Turrax T 50 emulsifier (from Janke & Kunkel/IKA), at 5000 rpm, 98.9 g of the aminosilicone oil emulsion E2 are homogenized with 1,1 g of diethyl L-tartrate over the course of a minute.

This gives a smooth white silicone oil emulsion B2 of low viscosity, having a solids content of 41% and a pH of 6.5. The particle size distribution is bimodal with a D50 of 110 nm. The emulsion is still uniform and stable after 4-week storage at 50° C.

Evaporation of the emulsion produces, after a drying time of 24 hours at 25° C., a white-opaque, elastic film which has a nontacky surface and adheres well to glass and aluminum.

Example 3: Emulsion B3

Using an Ultra-Turrax T 50 emulsifier (from Janke & Kunkel/IKA), at 5000 rpm, 98.9 g of the aminosilicone oil emulsion E3 are homogenized with 1,1 g of diethyl L-tartrate over the course of a minute.

This gives a smooth white silicone oil emulsion B3 of low viscosity, having a solids content of 41% and a pH of 6.5. The particle size distribution is bimodal with a D50 of 110 nm. The emulsion is still uniform and stable after 4-week storage at 50° C.

Evaporation of the emulsion produces, after a drying time of 24 hours at 25° C., a white-opaque, elastic film which has a nontacky surface and adheres well to glass and aluminum.

Example 4: Emulsion B4

Using an Ultra-Turrax T 50 emulsifier (from Janke & Kunkel/IKA), at 5000 rpm, 98.9 g of the aminosilicone oil emulsion E4 are homogenized with 1,1 g of diethyl L-tartrate over the course of a minute.

This gives a smooth translucent emulsion B4 of low viscosity, having a solids content of 33% and a pH of 6.5.

The particle size distribution is monomodal with a D50 of 56 nm. The emulsion is still uniform and stable after 4-week storage at 50° C.

Evaporation of the emulsion produces, after a drying time of 24 hours at 25° C., a white-opaque, elastic film which has a nontacky surface and adheres well to glass and aluminum.

Example 5: Emulsion B5

Using an Ultra-Turrax T 50 emulsifier (from Janke & Kunkel/IKA), at 5000 rpm, 98.9 g of an emulsion E5 are homogenized with 1,1 g of diethyl L-tartrate over the course of a minute. This gives a smooth white silicone oil emulsion B5 of low viscosity, having a solids content of 41% and a pH of 5. The particle size distribution is monomodal with a D50 of 186 nm. The emulsion is still uniform and stable after 4-week storage at 50° C.

Evaporation of the emulsion produces, after a drying time of 24 hours at 25° C., a white-opaque, gelatinous film which has a tacky surface and adheres weakly to glass and aluminum.

Example 6: Emulsion B6

Using an Ultra-Turrax T 50 emulsifier (from Janke & Kunkel/IKA), at 5000 rpm, 98.9 g of an emulsion E6 are homogenized with 1,1 g of diethyl L-tartrate over the course of a minute. This gives a smooth white silicone oil emulsion B6 of medium viscosity, having a solids content of 41% and a pH of 5. The particle size distribution is multimodal with a D50 of 171 nm. The emulsion is still uniform and stable after 4-week storage at 50° C.

Evaporation of the emulsion produces, after a drying time of 24 hours at 25° C., a white-opaque, gelatinous film which has a tacky surface and adheres weakly to glass and aluminum.

Example 7: Emulsion B7

Using an Ultra-Turrax T 50 emulsifier (from Janke & Kunkel/IKA), at 5000 rpm, 98.9 g of an emulsion E7 are homogenized with 1,1 g of diethyl L-tartrate over the course of a minute. This gives a smooth white silicone oil emulsion B7 of low viscosity, having a solids content of 41% and a pH of 5. The particle size distribution is bimodal with a D50 of 115 nm. The emulsion is still uniform and stable after 4-week storage at 50° C.

Evaporation of the emulsion produces, after a drying time of 24 hours at 25° C., a white-opaque, gelatinous film which has a tacky surface and adheres weakly to glass and aluminum.

Example 8

Using an Ultra-Turrax T 50 emulsifier (from Janke & Kunkel/IKA), at 4000 rpm, 4.9 g of an 80% aqueous solution of isotridecyldecaethoxylate, available commercially under the tradename Lutensol TO 10 (from BASF), and 2.4 g of fully demineralized water are premixed. 34.4 g of a hydroxy/methoxy-terminated copolymer composed of 3-(2-aminoethyl-amino)propylmethylsiloxy and dimethylsiloxy units, having an amine number of 0.13 and a viscosity of 4000 mm$^2$/s (at 25° C.), are added in three portions with shearing of 4000 rpm, to give a relatively firm stiff phase. This stiff phase is further prediluted with 4.9 g of fully demineralized water. At this point 1.1 g of diethyl L-tartrate are incorporated further at 4000 rpm.

Dilution is carried out with 51.2 g of fully demineralized water in portions, with gentle shearing, to form the desired emulsion, and 0.20 g of 80% acetic acid and 0.9 g of 2-phenoxyethanol are added.

This gives a smooth white silicone oil emulsion B8 of low viscosity, having a solids content of 40% and a pH of 5. The particle size distribution is monomodal with a D50 of 105 nm. The emulsion is still uniform and stable after 4-week storage at 50° C.

Evaporation of the emulsion produces, after a drying time of 24 hours at 25° C., a white-opaque, gelatinous film which has a tacky surface and adheres weakly to glass and aluminum.

Example 9

Using an Ultra-Turrax T 50 emulsifier (from Janke & Kunkel/IKA), at 4000 rpm, 5.5 g of an 80% aqueous solution of isotridecyldecaethoxylate, available commercially under the tradename Lutensol TO 10 (from BASF), and 5.5 g of fully demineralized water are premixed. A mixture of 33.76 g of a copolymer composed of 3-(2-aminoethylamino)propylmethylsiloxy and dimethylsiloxy units, having an amine number of 0.13 and a viscosity of 4000 mm$^2$/s (at 25° C.), and 1.04 g of diethyl L-tartrate are added in three portions with shearing of 4000 rpm, to give a relatively firm stiff phase as a preliminary emulsion. Dilution is carried out with 53.1 g of fully demineralized water in portions, with gentle shearing, to form the desired emulsion, and 0.20 g of 80% acetic acid and 0.9 g of 2-phenoxyethanol are added.

This gives a smooth white silicone oil emulsion B9 of low viscosity, having a solids content of 40% and a pH of 5. The particle size distribution is bimodal with a D50 of 134 nm. The emulsion is still uniform and stable after 4-week storage at 50° C.

Evaporation of the emulsion produces, after a drying time of 24 hours at 25° C., a white-opaque, gelatinous film which has a tacky surface and adheres weakly to glass and aluminum.

Example 10

A mixture of 97.0 g of a hydroxy/methoxy-terminated copolymer composed of 3-(2-aminoethylamino)propylmethylsiloxy and dimethylsiloxy units, having an amine number of 0.13 and a viscosity of 4000 mm$^2$/s (at 25° C.), and 3.0 g of diethyl L-tartrate are homogenized thoroughly with a paddle stirrer on a stirring apparatus from IKA. Immediately thereafter a film is cast, as described below. This gives a transparent elastomer film.

Comparative Experiments V1 and V2:

Comparative experiments V-1 and V-2 below represent production processes for the synthesis of noninventive aqueous emulsions.

Comparative Experiment V1 (Crosslinking with Noninventive Diethyl Succinate):

Using an Ultra-Turrax T 50 emulsifier (from Janke & Kunkel/IKA), at 5000 rpm, 99.91 g of the aminosilicone oil emulsion E1 are homogenized with 0.9 g of diethyl succinate over the course of a minute.

This gives a smooth white silicone oil emulsion V1 of low viscosity, having a solids content of 40% and a pH of 5. The particle size distribution is monomodal with a D50 of 110 nm. The emulsion is still uniform and stable after 4-week storage at 50° C.

Evaporation of the emulsion produces, after a drying time of 24 hours at 25° C., a white-opaque, pasty layer which adheres weakly to glass and aluminum.

Comparative Experiment V2 (Crosslinking with Noninventive Diethyl Oxalate as Per U.S. Pat. No. 5,039,738 A):

Using an Ultra-Turrax T 50 emulsifier (from Janke & Kunkel/IKA), at 5000 rpm, 99.91 g of the aminosilicone oil emulsion E1 are homogenized with 0.9 g of diethyl oxalate over the course of a minute.

This gives a smooth white silicone oil emulsion V2 of low viscosity, having a solids content of 40% and a pH of 5. The particle size distribution is monomodal with a D50 of 110 nm. The emulsion is still uniform and stable after 4-week storage at 50° C.

Evaporation of the emulsion produces, after a drying time of 24 hours at 25° C., a white-opaque, pasty layer which adheres weakly to glass and aluminum.

Rheology of Elastomer Films after Removal of Water:

Production of Films for Rheology Measurements:

A Teflon ring having an internal diameter of 40 mm is placed onto a circular glass plate having a diameter of 65 mm, to form a casting mold. Into this ring, 2.5 g of the emulsion under measurement are weighed out onto the glass plate without bubbles. The cast emulsion is then left to dry at 25° C. and 101.425 kPa. It should be ensured that the casting mold with the cast emulsion for drying is located on a leveled planar surface, to allow a film of uniform thickness to develop. In this case, after drying, a film around 0.5 mm thick is obtained.

After a standing time of 1 week at 25° C., the films obtained undergo rheological analysis. The measurements were made using an MCR 302 rheometer from Anton Paar, employing a PP12.5 plate/plate measurement system and a gap height of 0.5 mm. The instrument was calibrated using standard oil 10 000 from the Physikalisch-Technische Bundesanstalt. The measuring temperature is 25.00° C. +/−0.05° C.

The values listed in table 1 for the storage modulus G', the loss modulus G" and the loss factor tan δ can be computed by applying a sinusoidal deformation to measure the shear stress and the phase shift angle δ. The measured values listed in table 1 were measured at a frequency of 1 Hz and a deformation of 0.1%. Under deformation, the measured samples are in the linear viscoelastic measuring range. The following relationship applies: tan δ=G"/G'. If tan δ<1, the elastic character of the sample is predominant; if tan δ>1, the viscous character of the sample is predominant.

The results of the rheology measurements for the elastomer films of inventive examples B1 to B10, of comparative experiments V-1 and V-2 and also of the uncrosslinked aminosilicone oil emulsions E1 to E7 are collated in table 1.

TABLE 1

Rheological data of the elastomer films

| Ex./comp. Ex. | Storage modulus G' [Pa] | Loss modulus G" [Pa] | tan δ |
|---|---|---|---|
| B1 | 20 600 | 5930 | 0.29 |
| B2 | 10 600 | 2630 | 0.25 |
| B3 | 37 900 | 7890 | 0.21 |
| B4 | 2060 | 1290 | 0.63 |
| B5 | 15 600 | 1880 | 0.12 |
| B6 | 29 100 | 5080 | 0.18 |
| B7 | 9020 | 4010 | 0.45 |
| B8 | 13 200 | 4190 | 0.32 |
| B9 | 13 200 | 4190 | 0.32 |
| B10 | 53 200 | 16 300 | 0.31 |

TABLE 1-continued

Rheological data of the elastomer films

| Ex./comp. Ex. | Storage modulus G' [Pa] | Loss modulus G" [Pa] | tan δ |
|---|---|---|---|
| V-1 | 231 | 725 | 3.13 |
| V-2 | 11 900 | 7860 | 0.66 |
| E1 | 53 | 319 | 6.05 |
| E2 | 405 | 723 | 1.78 |
| E3 | 18.1 | 248 | 13.6 |
| E4 | 12 | 211 | 18.1 |
| E5 | 1.3 | 19.6 | 15.3 |
| E6 | 100 | 451 | 4.5 |
| E7 | 143 | 765 | 5.4 |

Table 1 shows that the inventive emulsions B1 to B9 with diethyl L-tartrate as crosslinker component form elastic films following removal of water, since tan δ<1. In example 10 as well an elastic film is formed.

The noninventive emulsion V2 (containing diethyl oxalate as crosslinker) likewise forms an elastic film on removal of water.

In contrast, the noninventive emulsion V1, containing diethyl succinate rather than diethyl L-tartrate, does not form a film. This is shown by the loss factor of 3.13.

The evaporated, pure aminosilicone oil emulsions E1 to E7 likewise show no filming on removal of water, since in all cases tan δ is greater than 1. This shows that the addition of a crosslinker is necessary in order to achieve filming.

These results show, surprisingly, that filming occurs as a result of the addition of the hydroxy-functional crosslinker diethyl L-tartrate according to the invention, but not by the addition of the noninventive, unfunctionalized diester, such as diethyl succinate.

Test Methods for Assessing the Effect of Cosmetic Compositions:

Natural Hair

The application behavior of the cosmetic composition and its effect in terms of combing force and softness were assessed on Caucasian hair, available from Kerling International Haarfabrik GmbH. Before being used, undamaged tresses of natural hair are cleaned and where appropriate, in a further process step, damaged by bleaching.

Basic Cleaning

For cleaning, the undamaged hair tresses are placed for an hour in a solvent mixture composed of equal parts of toluene and isobutyl ketone, and shaken. Following removal of the solvent mixture, the hair tresses are washed in each case twice with 3 ml of ammonium lauryl sulfate solution (25%), STEPANOL® ALS 25, from STEPAN Company, and then with fully demineralized water having a temperature of 30° C. The tresses are detangled using a coarse-tooth comb. The hair tresses are placed subsequently for an hour in a large beaker of fully demineralized water, withdrawn, and additionally rinsed under running, fully demineralized water. After the basic cleaning, and before being used further, the tresses are conditioned for at least 12 hours at 23° C. and 50% humidity and are combed before being used.

Bleaching of Hair—Generation of Damaged Hair

Damaged hair is generated by bleaching of cleaned natural hair tresses. This is done by placing five hair tresses in each case for 30 minutes into a solution composed of 30% hydrogen peroxide and 25% ammonia (ratio 33.5:1). The hair is subsequently thoroughly rinsed off with fully demineralized water and washed twice with 3 ml of ammonium lauryl sulfate solution (25%), STEPANOL® ALS 25, from STEPAN Company, and with fully demineralized water having a temperature of 30° C. Thereafter the hair tresses are placed for an hour in a large beaker of fully demineralized water, withdrawn, and further rinsed under running, fully demineralized water. Prior to further treatment, the bleached tresses are conditioned for at least 12 hours at 23° C. and 50% humidity and are combed before being used.

Combing Force Measurement:

The combing force on wet and dry hair was determined using hair tresses of damaged Caucasian hair from Kerling International Haarfabrik GmbH (hair tresses degree of damage B, double-drawn) having a weight of 2 g and a length of 20 cm. The combing force was measured by the double comb method of Y. K. Kamath and Hans-Dietrich Weigmann, J. Soc. Cosmet. Chem., 37, 111-124, 1986, using an Instron 3343 tension-elongation machine. First of all the wet and dry combing force is determined along the measurement section on untreated hair tresses. The hair tresses are then treated with an inventive cosmetic composition and the force absorption during the combing procedure is determined. The measurement value reported is the reduction in combing force along the measurement section (work) that arises between the treated and untreated hair tress. The mean value from five hair tresses is formed. The combing force reduction is reported as a percentage.

Smoothness/Softness (According to Tensile Testing):

The softness of the hair was determined using hair tresses from Kerling International Haarfabrik GmbH (Caucasian hair, double-drawn) having a weight of 2 g and a length of 20 cm. The hair softness in the dry state was determined using an Instron 3343 tensile testing machine, by correlating the required tensile force with the parameters of flexural stiffness and surface roughness of the hair bundle. These two parameters correlate in turn with the hair softness. For this purpose, an untreated hair tress was clamped into a measurement setup consisting of five rods lying opposite one another with an offset. The shape of the hair tress in this initial position is a kind of double S. Following this preparation, the hair tress is pulled out of the measurement setup in one direction and the force required is evaluated along the measurement section, as work. The hair tresses are then treated with an inventive cosmetic composition and the force absorption on pulling of the hair tress through the measurement setup is determined along the measurement section. The measurement value reported is the reduction in tensile force along the measurement section (work) which arises between the treated and untreated hair tress. A large reduction in tensile force (work) corresponds to a good soft feel/high smoothness. The mean is formed from five hair tresses.

Softness (According to Panel Test):

For assessing the softness of hair tresses, their tactile properties are assessed by experts (trained panelists). The hair tresses are compared in pairs in each case—for example, shampoo-treated hair as compared with untreated hair. The number of pairs of tresses assessed is at least three, the number of panelists at least five. The evaluation was based on hair tresses from Kerling International Haarfabrik GmbH (Caucasian hair, double-drawn) having a weight of 2 g and a length of 20 cm.

Washing Procedure, Shampoo:

Shampoo is applied at 0.2 g per g of hair to a cleaned, wetted hair tress. The shampoo is massaged in for 30 seconds in the direction of the hair ends. The hair tress is then rinsed for 30 s under running, fully demineralized water, and detangled using a coarse-tooth comb. The procedure is repeated twice. On the last occasion, the rinsing process is extended to 60 s. The hair tress is then dried for at least 12 h at an atmospheric humidity of 50% and a temperature of 23° C.

Washing Procedure, Conditioner:

Rinse-off conditioner is applied at 0.3 g/g of hair to a cleaned, wetted hair tress. The rinse-off conditioner is massaged in for 120 seconds in the direction of the hair ends. The hair tress is then rinsed for 60 s under running, fully demineralized water, and detangled using a coarse-tooth comb. The procedure is repeated. The hair tress is then dried for at least 12 h at an atmospheric humidity of 50% and a temperature of 23° C.

Determination of the Amount of Si Deposited on the Hair Surface in Ppm (Silicone Deposition):

The amount of silicone deposited on the hair surface is determined using an energy-dispersive x-ray fluorescence spectrometer (AMETEK, XEPOS). The hair bundles are placed in a specially manufactured sample holder, having a circular measurement area of 12 mm in diameter. The hair surface in the region of the measurement area is smooth, and the hairs are aligned in parallel. The sample is excited under the helium atmosphere, using a palladium tube (17.05 kV, 2.0 mA). The excitation time is 300 s. Control samples (natural hair tresses) are subjected to regular measurement. In the event of deviations, a drift correction takes place using glass tablets. The calibration standards used were hair tresses loaded with polydimethylsiloxane in the 50 to 2000 ppm range (control by atomic absorption spectroscopy).

To determine the effectiveness of the silicone deposition, a determination is made first of the amount of Si in ppm on a cleaned hair bundle=blank value. The same hair bundle is subsequently treated, by being washed with a shampoo, for example. The amount of Si in ppm is determined again=sample value. The amount of Si in ppm deposited is obtained by performing the following subtraction: sample value—blank value. Each hair tress is measured centrally on the facing and reverse sides. The result reported is the mean value from three hair tresses.

Simulation of Shampooing by Stirring Hair Tresses in a Surfactant Solution:

Many users desire cosmetic effects such as improved hair softness, reduction in wet combing force and retention of hair color to persist following application of a hair-conditioning product, in spite of multiple subsequent washes with shampoo. To assess the persistence of cosmetic effects following treatment of hair with an inventive cosmetic composition, a method was developed which constitutes a simulation of successive shampooings. For this purpose a treated hair tress in a 100 ml jar with screw-top lid is admixed with 50 ml of a five percent solution of ammonium lauryl solvate, this solution having been conditioned to 40° C. and obtained by diluting Stepanol® ALS 25, from Stepan Company, and the treated tress is shaken for a mandated time in an incubation shaker (Heidolph Unimax 1010+ Incubator 1000) conditioned to 40° C., with a speed of 250 rpm. After having been shaken, the tresses are rinsed for a minute with fully demineralized water having a temperature of 30° C., and dried.

Color Protection/Color Measurement:

The inventive cosmetic composition was assessed for color protection effect on keratin fibers, using colored real hair. This was done using hair tresses having a weight of 4 g and a length of 20 cm, composed of damaged, Caucasian hair from Kerling International Haarfabrik GmbH (dense adhesive tress of European hair, bleaching stage A, mixture 79). The hair tresses were colored red. The shade used was Koleston Perfect® 77/44 from Wella or Majirel Mix Rouge from L'Oreal. 50 ml of hair coloring paste were mixed with 80 ml of six percent hydrogen peroxide solution. The paste was applied evenly to the hair tresses (1.6 g of paste/g of hair). After a contact time of 40 minutes at room temperature, the coloring paste was washed out of the hair tresses. Following treatment of the hair tress with a surfactant solution (Stepanol® ALS 25, from Stepan Company, diluted to 5% active content) and drying of the tresses, the coloring operation was repeated when using Koleston Perfect® 77/44.

Color measurement is performed on the smooth surface of the hair bundles, using the Spectro Guide colorimeter from Byk-Gardner. The color parameters L, a, b (Lab color space) are recorded.

Assessment of Color Protection by Hair Treatment with Inventive Cosmetic Compositions:

Colored hair undergoes a change in perceived color after washing with shampoo. The change in perceived color may be described by the □E value, which is defined as:

$$\Box E = ((L1-Lo)^2 + (a1-a0)^2 + (b1-b0)^2)^{1/2}$$

L0, a0, b0 are the color values for a colored, untreated hair bundle.

L1, a1 and b1 are the color values for the hair bundle after simulation of shampooings, by stirring of hair tresses in a surfactant solution. A low □E value is an indicator of relatively low color change or enhanced persistence.

Examples of Cosmetic Compositions

Examples A1 to A4 (Rinse-Off Conditioners (Rinse)) A1-A4

The examples below represent inventive cosmetic compositions A1-A4 according to table 2, comprising the emulsions B1 and B2 from examples 1 and 2. The active content—the amount of precrosslinked organopolysiloxane in the cosmetic composition—is 0.5% to 2%.

Preparation instructions:

Water is introduced and heated to 75° C. with stirring. 1.3 parts of hydroxyethylcellulose are added. When 65° C. is attained, 0.5 part of Polysorbate 80, 0.5 part of Stearyl Alcohol, 0.5 part of Cetyl Alcohol and 0.2 part of Behentrimonium Chloride are added. The mixture is stirred until 75° C. is reached and the ingredients are in solution. The mixture is then cooled. In the course of cooling, 0.1 part of Citric Acid and 0.2 part of Tetrasodium EDTA are added. At 35° C., 0.9 part of Phenoxyethanol, and ethylhexylglycerin are added. With further stirring, the emulsion from the examples is added. The composition is homogenized with stirring for 15 minutes.

TABLE 2

Rinse-off conditioners A1-A4

| Constituents (INCI name) | Ex. A1 [Parts by wt] | Ex. A2 [Parts by wt] | Ex. A3 [Parts by wt] | Ex. A4 [Parts by wt] |
| --- | --- | --- | --- | --- |
| Water | ad 100 | ad 100 | ad 100 | ad 100 |
| Hydroxyethylcellulose [1] | 1.3 | 1.3 | 1.3 | 1.3 |
| Cetyl Alcohol [2] | 0.5 | 0.5 | 0.5 | 0.5 |
| Polysorbate 80 [3] | 0.5 | 0.5 | 0.5 | 0.5 |
| Behentrimonium Chloride [4] | 0.2 | 0.2 | 0.2 | 0.2 |
| Stearyl Alcohol [5] | 0.5 | 0.5 | 0.5 | 0.5 |
| Citric Acid [6] | 0.1 | 0.1 | 0.1 | 0.1 |
| Tetrasodium EDTA [7] | 0.2 | 0.2 | 0.2 | 0.2 |
| Emulsion B1 from ex. 1 | 5.71 | | | |
| Emulsion B1 from ex. 1 | | 1.43 | | |
| Emulsion B2 from ex. 2 | | | 5.71 | |
| Emulsion B2 from ex. 2 | | | | 1.43 |
| Phenoxyethanol, Ethylhexylglycerin [8] | 0.9 | 0.9 | 0.9 | 0.9 |

The raw materials stated in table 2 are available under the following tradenames:
[1] Hydroxyethylcellulose: Natrosol 250 HR, Ashland
[2] Cetyl alcohol: cetyl alcohol, Merck KGaA
[3] Polysorbate 80: Tween™ 80, Croda GmbH
[4] Behentrimonium Chloride: Genamin® KDMP, Clariant GmbH
[5] Stearyl alcohol: stearyl alcohol, Merck KGaA
[6] Citric Acid: citric acid, Sigma
[7] Tetrasodium EDTA: EDETA® B Powder, BASF Corporation
[8] Phenoxyethanol, Ethylhexylglycerin: Euxyl PE 9010, Schülke & Mayr Comparative Experiments V-A1 to V-A5 (Rinse-Off Conditioners (Rinse) V-A1-V-A5, not Inventive)

Comparative experiments V-A1 to V-A5 below represent noninventive cosmetic compositions V-A1-V-A4 comprising an aqueous dispersion of a non-precrosslinked organopolysiloxane or a noninventive cosmetic composition comprising a precrosslinked aqueous dispersion using the noninventive diethyl oxalate. The active content—the amount of organopolysiloxane—is 0.5 to 2 wt %. For the preparation of the cosmetic compositions of comparative experiments V-A1 to V-A5, the procedure for examples A1-A4 was repeated, with the modification that instead of the emulsions B1 and B2 from examples 1 and 2 (emulsions of inventive precrosslinked organopolysiloxane), the uncrosslinked emulsions E1 and E2 or the emulsions of the noninventive comparative experiment V2 are used. Emulsions of comparative experiments E1 and E2 contain organopolysiloxanes which are analogous in terms of initial viscosity to examples B1 and B2, but are uncrosslinked. The emulsion of comparative experiment V2 is precrosslinked with the noninventive diethyl oxalate rather than with the inventive diethyl L-tartrate.

TABLE 3

Rinse-off conditioners V-A1-VA5

| Constituents (INCI name) | Comp. exp. V-A1 [parts by wt.] | Comp. exp. V-A2 [parts by wt.] | Comp. exp. V-A3 [parts by wt.] | Comp. exp. V-A4 [parts by wt.] | Comp. exp. V-A5 [parts by wt.] |
| --- | --- | --- | --- | --- | --- |
| Water | ad 100 | ad 100 | ad 100 | ad 100 | ad 100 |
| Hydroxyethylcellulose [1] | 1.3 | 1.3 | 1.3 | 1.3 | 1.3 |
| Cetyl Alcohol [2] | 0.5 | 0.5 | 0.5 | 0.5 | 0.5 |
| Polysorbate 80 [3] | 0.5 | 0.5 | 0.5 | 0.5 | 0.5 |
| Behentrimonium Chloride [4] | 0.2 | 0.2 | 0.2 | 0.2 | 0.2 |
| Stearyl Alcohol [5] | 0.5 | 0.5 | 0.5 | 0.5 | 0.5 |
| Citric Acid [6] | 0.1 | 0.1 | 0.1 | 0.1 | 0.1 |

TABLE 3-continued

Rinse-off conditioners V-A1-VA5

| Constituents (INCI name) | Comp. exp. V-A1 [parts by wt.] | Comp. exp. V-A2 [parts by wt.] | Comp. exp. V-A3 [parts by wt.] | Comp. exp. V-A4 [parts by wt.] | Comp. exp. V-A5 [parts by wt.] |
|---|---|---|---|---|---|
| Tetrasodium EDTA [7] | 0.2 | 0.2 | 0.2 | 0.2 | 0.2 |
| Emulsion E1 from ex. 1 | 5.71 | | | | |
| Emulsion E1 from ex. 1 | | 1.43 | | | |
| Emulsion E2 from ex. 2 | | | 5.71 | | |
| Emulsion E2 from ex. 2 | | | | 1.43 | |
| Emulsion V2 from comp. Exp. V2 | | | | | 5.71 |
| Phenoxyethanol, Ethylhexyl-glycerin [8] | 0.9 | 0.9 | 0.9 | 0.9 | 0.9 |

The raw materials stated in table 3 are available under the following tradenames:
[1] Hydroxyethylcellulose: Natrosol 250 HR, Ashland
[2] Cetyl alcohol: cety l alcohol, Merck KGaA
[3] Polysorbate 80: Tween ™ 80, Croda GmbH
[4] Behentrimonium Chloride: Genamin ® KDMP, Clariant GmbH
[5] Stearyl alcohol: stearyl alcohol, Merck KGaA
[6] Citric Acid: citric acid, Sigma
[7] Tetrasodium EDTA: EDETA ® B Powder, BASF Corporation
[8] Phenoxyethanol, Ethylhexylglycerin: Euxyl PE 9010, Schülke & Mayr Preparation Instructions:

Water is introduced and heated to 75° C. with stirring. 1.3 parts of hydroxyethylcellulose are added. When 65° C. is attained, 0.5 part of Polysorbate 80, 0.5 part of Stearyl Alcohol, 0.5 part of Cetyl Alcohol and 0.2 part of Behentrimonium Chloride are added. The mixture is stirred until 75° C. is reached and the ingredients are in solution. The mixture is then cooled. In the course of cooling, 0.1 part of Citric Acid and 0.2 part of Tetrasodium EDTA are added. At 35° C., 0.9 part of Phenoxyethanol, ethylhexylglycerin are added. With further stirring, the emulsion according to table 3 for the comparative experiment is added. The composition is homogenized with stirring for 15 minutes.

Comparison of the Rinse-Off Conditioners of Inventive Examples A1-A4 with the Comparative Experiments V-A1 to V-A4

The recited examples and comparative experiments differ in that in the case of examples A1-A4, inventive aqueous dispersions of precrosslinked organopolysiloxanes were used, while comparative experiments V-A1 to V-A4 used in each case analogous aqueous dispersions of the corresponding non-precrosslinked organopolysiloxanes. The active content—the amount of organopolysiloxane in the cosmetic composition—is 0.5 wt %.

The following examples/comparative experiments correlate in a direct comparison:
Example A1—Comparative experiment V-A1
Example A2—Comparative experiment V-A2
Example A3—Comparative experiment V-A3
Example A4—Comparative experiment V-A4

Wet Combing Force after Treatment of Damaged Hair with Rinse-Off Conditioner and after Simulation of Multiple Shampooings by Stirring the Hair in an Aqueous Surfactant Solution (Persistence Effect)

Example A2—Comparative Experiment V-A2

The use of the aqueous dispersion B1 of inventively precrosslinked organopolysiloxanes in the rinse-off conditioner (example A2) leads to an improvement in conditioning properties, such as the reduction of the combing forces in the wet state, for example, in comparison to the noninventive rinse-off conditioner from example V-A2, which contains the non-precrosslinked organopolysiloxane E1. An additional aim of the rinse-off conditioners of the invention is that the caring properties are retained even after multiple shampooing of the hair. The operation of shampooing is simulated in this example by the stirring of hair bundles, treated with rinse-off conditioner, for four hours in a surfactant solution. The details of this treatment are described above under Test Methods.

The results of the determination of the combing force in the wet state are set out below for the rinse-off conditioners of examples A2 and V-A2 in table 4.

TABLE 4

Rinse-off conditioners/results for reduction in wet combing force on damaged Caucasian hair after treatment with an inventive rinse-off conditioner in comparison to a noninventive conditioner and after simulation of multiple shampooings by four-hour stirring of the hair in an aqueous surfactant solution. All results refer to the comparison relative to untreated hair tresses.

| Ex./ Comp. | Reduction in wet combing force after conditioner treatment [%] | Reduction in wet combing force after conditioner treatment and subsequent stirring of the hair in an aqueous surfactant solution (persistence test) [%] |
|---|---|---|
| A2 | 89 | 47 |
| V-A2 | 85 | 34 |

By treatment with the inventive rinse-off conditioner containing an aqueous emulsion of a precrosslinked organopolysiloxane B1 (example A2) it is possible to measure, at 89%, a significant reduction in the wet combing force for the hair tresses. In particular, a very high conditioning effect is retained after stirring of the treated hair in a surfactant solution, and this is reflected in a persistent wet combing force reduction of 47%. Hair treated with a noninventive rinse-off conditioner containing the emulsion E1 (comparative example V-A2) exhibits a slightly reduced reduction in wet combing force, of 85%. Following the surfactant treatment, however, the reduction in wet combing force, of 34%, is much lower by comparison with example A2. The treatment of the hair in surfactant solution represents a simulation of multiple hair washes with shampoo, and demonstrates that the inventive rinse-off conditioner exhibits better wash resistance and that the conditioning properties are retained for longer than in the case of hair treatment with a noninventive rinse-off conditioner.

Comparison of Silicone Deposition after Treatment of Damaged Hair with Rinse-Off Conditioner and after Simulation of Multiple Shampooings by Four-Hour Stirring of the Hair in an Aqueous Surfactant Solution
Example A2—Comparative experiment V-A2
Example A4—Comparative experiment V-A4

In analogy to the determination of the reduction in wet combing force, the efficiency of silicone deposition on damaged hair by treatment with conditioners was studied. A study was also carried out into how much of the conditioning organopolysiloxane remains on the hair surface after simulation of shampooings by four-hour stirring of the hair in a surfactant solution. The results are collated in table 5. The determination of silicone deposition is described above under Test Methods.

TABLE 5

Rinse-off conditioners/silicone deposition

| Ex./ Comp. | Silicone deposition [ppm] | Silicone deposition after stirring of the hair in an aqueous surfactant solution (persistence test) [ppm] |
|---|---|---|
| A2 | 65 | 55 |
| V-A2 | 47 | 41 |
| A4 | 79 | 42 |
| V-A4 | 67 | 32 |

Table 5 shows that the deposition of the silicone—even after shampooing—is more durable for the inventive examples A2 and A4 by comparison with the noninventive comparative experiments V-A2 and V-A4, respectively.

Color Retention after Treatment of Red-Colored Hair with Rinse-Off Conditioner and Simulation of Multiple Shampooings by 10-Minute Stirring of the Hair in an Aqueous Surfactant Solution Example A2—Comparative Experiment V-A2

The color protection was determined on hair which had been colored red using the Wella hair color Koleston Perfect® 77/44 (see above under Test methods). The colored hair was subsequently treated with an inventive rinse-off conditioner as per example A2 or with a noninventive conditioner as per comparative experiment V-A2. The initial color of the hair after treatment with the two conditioners was the same. To assess the color protection effect of the applied conditioners, the hair was shaken for 10 minutes each case in a surfactant solution, corresponding to a simulation of multiple shampooings. Then the change in color was determined in comparison to the initial color (see table 6). The color measurement and the assessment of the color protection are described above under Test methods.

TABLE 6

Rinse-Off conditioners/results of the color protection measurements after treatment of the colored hair with an inventive rinse-off conditioner in comparison to treatment with a noninventive conditioner, which does not contain a dispersion of a nonprecrosslinked organopolysiloxane, and subsequent simulation of multiple shampooings by 10-minute stirring of the hair in an aqueous surfactant solution. All results in comparison to freshly colored hair.

| Ex./comp. | □E | □L |
|---|---|---|
| A2 | 5.7 | 3.6 |
| V-A2 | 8.0 | 6.2 |

The change in color as a result of shaking of the hair in surfactant solution to simulate multiple shampooings is lower on treatment of the hair with inventive conditioner A2, at □E=5.7, than in the case of the noninventive conditioner V-A2, at □E=8.0. The change in lightness is lower on hair treatment with inventive conditioner A2, □L=3.6, than in the case of hair treatment with noninventive conditioner V-A2, at □L=6.2. Both parameters emphasize that the inventive precrosslinked organopolysiloxanes produce better color protection than the uncrosslinked organopolysiloxanes.

Care properties and color protection effect of conditioners comprising organopolysiloxanes precrosslinked with inventive esters, in comparison to conditioners comprising organopolysiloxanes precrosslinked with diethyl oxalate (not inventive).

Comparison of the Rinse-Off Conditioners of Inventive Examples A1 and A3 with the Comparative Experiment V-A5 (Diethyl Oxalate Crosslinking)

The recited examples and comparative experiments differ in that in the case of examples A1 and A3, aqueous dispersions of organopolysiloxanes precrosslinked with inventive esters were used, while in comparative experiment V-A5, analogous organopolysiloxanes but precrosslinked with diethyl oxalate (not inventive) were used. The active content—the amount of organopolysiloxane in the cosmetic composition—is 2 wt %.

Wet Combing Force after Treatment of Damaged Hair with Rinse-Off Conditioner and after Simulation of Multiple Shampooings by Four-Hour Stirring of the Hair in an Aqueous Surfactant Solution The use of the inventive aqueous dispersion B1 in the rinse-off conditioner leads to an improvement in conditioning properties such as, for example, the reduction of the combing forces in the wet state in comparison to the corresponding organopolysiloxane dispersion V-A5, precrosslinked noninventively with diethyl oxalate. An additional aim of the rinse-off conditioners of the invention is that the caring properties are retained even after multiple shampooings of the hair. The operation of shampooing in this example is simulated by four-hour stirring of hair bundles, treated with rinse-off conditioner, in a surfactant solution. The details of this treatment are described above under Test methods.

The results are set out below for the rinse-off conditioners of example A1 and also of comparative experiment V-A5, in table 7.

TABLE 7

Rinse-off conditioners/results of the reduction in wet combing force after treatment with an inventive rinse-off conditioner in comparison to a noninventive conditioner and after simulation of multiple shampooings by four-hour stirring of the hair in an aqueous surfactant solution. All results relate to the comparison relative to untreated hair tresses.

| Ex./ comp. | Reduction in wet combing force[%] | Reduction in wet combing force after stirring of the hair in an aqueous surfactant solution [%] |
|---|---|---|
| A1 | 85 | 48 |
| V-A5 | 82 | 26 |

By treatment with a rinse-off conditioner containing an aqueous emulsion of a precrosslinked organopolysiloxane B1, it is possible to measure a significant reduction in the wet combing force for the hair tresses, of 85%. In particular, a very high conditioning effect is retained after stirring of the treated hair in a surfactant solution, and this is reflected in a reduction of 48% in wet combing force for example A1. Hair treated with a noninventive rinse-off conditioner as per comparative experiment V-A5 exhibits a reduction in wet combing force of 82%, but after the surfactant treatment the reduction in wet combing force drops to 26%. The treatment of the hair in surfactant solution represents a simulation of multiple hair washes with shampoo, and demonstrates that an inventive rinse-off conditioner exhibits better wash resistance and that the conditioning properties are retained for longer than in the case of hair treatment with a noninventive rinse-off conditioner.

Example A5: Use of Inventive Emulsions for Pretreatment in Hair Coloring

The coloring of hair with oxidative colors results in severe damage to the hair fibers. Not only the structure of the hair interior but also the hair surface are modified by the hair coloring procedure, in comparison to natural hair, and this is to the detriment of the cosmetic properties such as soft hair feel and combability. These negative effects can be counteracted by pretreating the hair with inventive cosmetic formulations prior to the coloring operation.

Pretreatment was carried out by immersing highly bleached hair (dense adhesive tress of European hair, bleaching level A) for one minute in a 0.1 percent solution of the emulsion B1 (from example 1) in water. The hair is then taken from the aqueous solution and blown dry with a hair dryer for five minutes. After this pretreatment, the hair is colored as described above under Test Methods, using the hair color L'Oreal Majirel Mix Rouge.

After the coloring and drying of the hair at 22° C. and 50% atmospheric humidity, the softness of pretreated hair was compared, in a panel test, with that of hair not treated before the coloring operation. The pretreated hair was consistently rated as being softer. There was no visually perceptible difference in color between pretreated and untreated hair after the coloring operation. Subsequently, in order to simulate multiple shampooings, both the pretreated hair and the unpretreated hair were stirred in an aqueous surfactant solution as described above (under Test Methods) for ten minutes. After the hair had dried, the panel test for assessing the softness of the hair tresses was repeated. After the surfactant treatment as well, the pretreated hair was consistently rated as being softer. This indicates a high persistence of the cosmetic effect after pretreatment of the hair with inventive cosmetic emulsions/compositions.

In addition, the change in color □E of the colored hair after the surfactant treatment was determined by comparison with the initial value, using the Spectro Guide colorimeter from Byk-Gardner. For the pretreated hair tresses, the color change □E=4.6 is lower than for unpretreated hair tresses, at □E=7.3. Pretreatment of the hair with inventive cosmetic emulsions/compositions leads to better color retention.

Examples A6 and A7 and Comparative Experiment V-A6

Cosmetic Composition: Shampoo

The examples below represent inventive cosmetic compositions comprising emulsions B4 from example 4 and B7 from example 7. The comparative example V-A6 represents a standard commercial shampoo formulation containing an emulsion of a dimethicone (dimethylpolysiloxane; Belsil® DM 5102 E, available from Wacker Chemie AG) having a viscosity of 60 000 mm$^2$/s (at 25° C.).

The active content—the amount of organopolysiloxane in the cosmetic composition—is 1.3%. The composition of the shampoos is summarized in table 8.

Preparation Instructions:

32.11 parts of water are introduced and heated to 50° C. with stirring. During this time, 0.20 part of Guar Hydroxylpropyltrimonium Chloride, 6.06 parts of Sodium Lauryl Sulfate, 29.90 parts of Sodium Laureth Sulfate, 0.05 part of Citric Acid and 5.0 parts of Cocamidopropyl Betaine are added. The mixture is stirred until 50° C. has been reached and the ingredients are present in solution. The mixture is then cooled. A separate vessel is charged with 20.0 parts of water; 0.60 part of Carbomer is added with stirring, and stirring is continued until the mixture is homogeneous. Then 0.06 part of lactic acid is added. This mixture is added to the first mixture. At 40° C., 0.95 part of Phenoxyethanol, Ethylhexylglycerin are added. Added with further stirring are 0.30 part of C12-13 Alkyl Lactate, 3.71 parts of inventive emulsions B4 and B7, or 2.60 parts of the noninventive Dimethicone Emulsion Belsil® DM 5102 E, 0.40 part of Sodium Hydroxide and 0.66 part of Sodium Chloride. The required pH of 6.5 can be set where necessary by adding sodium hydroxide.

TABLE 8

Shampoo formulations A6, A7 and V-A6

| Constituents (INCI Name) | Example A6 [parts by wt.] | Example A7 [parts by wt.] | Comparative experiment V-A6 [parts by wt.] |
|---|---|---|---|
| Citric Acid[1] | 0.05 | 0.05 | 0.05 |
| Cocamidopropyl Betaine[2] | 5.00 | 5.00 | 5.00 |
| Sodium Laureth Sulfate[3] | 29.90 | 29.90 | 29.90 |
| Guar Hydroxypropyltrimonium Chloride[4] | 0.20 | 0.20 | 0.20 |
| Sodium Lauryl Sulfate[5] | 6.06 | 6.06 | 6.06 |
| Aqua (DI Water) | 32.11 | 32.11 | 32.11 |
| Carbomer[6] | 0.60 | 0.60 | 0.60 |
| Lactic Acid[7] | 0.06 | 0.06 | 0.06 |
| Aqua (DI Water) | 20.00 | 20.00 | 20.00 |
| Phenoxyethanol, Ethylhexylglycerin[8] | 0.95 | 0.95 | 0.95 |
| C12-13 Alkyl Lactate[9] | 0.30 | 0.30 | 0.30 |
| Emulsion B4 from Ex. 4 | 3.71 | | |
| Emulsion B7 from Ex. 7 | | 3.71 | |
| Belsil® DM 5102 E[10] (Dimethicone Emulsion) | | | 2.60 |
| Sodium Hydroxide[11] | 0.40 | 0.40 | 0.40 |
| Sodium Chloride[12] | 0.66 | 0.66 | 0.66 |

[1]Citric Acid: citric acid, Sigma
[2]Cocamidopropyl Betaine: Genagen CAB 818 30%, Clariant
[3]Sodium Laureth Sulfate: Genapol® LRO 26.5%, Clariant
[3]Glycol Distearate: Genapol® PMS, Clariant GmbH
[4]Guar Hydroxypropyltrimonium Chloride: N-Hance® BF 13, Ashland
[5]Sodium Lauryl Sulfate: Texapon K 12 G, BASF
[6]Carbomer: Carbopol 980, Lubrizol
[7]Lactic Acid: L-(+)Lactic Acid, 90%, Bernd Kraft GmbH
[8]Phenoxyethanol, Ethylhexylglycerin: Euxyl PE 9010, Schülke & Mayr
[9]C12-13 Alkyl Lactate: Ceraphyl™ 41 ester, Ashland
[10]Belsil® DM 5102 E, available from Wacker Chemie AG
[11]Sodium Hydroxide: Sodium Hydroxide, Sigma-Aldrich
[12]Sodium Chloride: Sodium Chloride ultrapure, Bernd Kraft GmbH Comparison of the Shampoos of Inventive Examples A6 and A7 with Comparative Experiment V-A6

The recited examples and comparative experiments differ in that in the case of examples A6 and A7, aqueous dispersions of precrosslinked organopolysiloxanes were used. In comparative experiment V-A6, the commercial aqueous dimethylpolysiloxane emulsion Belsil® DM 5102 E (Wacker Chemie AG) is used, which as active conditioning ingredient comprises a dimethicone (dimethylpolysiloxane) with the viscosity of 60 000 mm$^2$/s. The active content—the amount of organopolysiloxane in the cosmetic compositions—is 1.3 wt %.

The results for the cosmetic effect of the shampoos are collated in table 9.

TABLE 9

Shampoo/results for reduction in wet combing force. Improvement in the softness and amount of silicone deposited on damaged hair after treatment with shampoo. All results in comparison to untreated hair tresses.

| Ex./ comp. | Reduction in wet combing force [%] | Improvement in softness [%] | Silicone deposition on hair surface [ppm] |
|---|---|---|---|
| Ex. A6 | 67 | 28 | 126 |
| Ex. A7 | 68 | 55 | 140 |

TABLE 9-continued

Shampoo/results for reduction in wet combing force. Improvement in the softness and amount of silicone deposited on damaged hair after treatment with shampoo. All results in comparison to untreated hair tresses.

| Ex./comp. | Reduction in wet combing force [%] | Improvement in softness [%] | Silicone deposition on hair surface [ppm] |
|---|---|---|---|
| Comparative experiment V-A6* | 20 | 2 | 46 |

*)Belsil ® DM 5102 E (dimethicone emulsion), available from Wacker Chemie AG

The shampoos of examples A6 and A7 with the inventive emulsions exhibit a substantially higher reduction in wet combing force, a significantly improved softness (according to tensile testing) and a substantially higher deposition of the silicone on the hair, in comparison to the shampoo as per comparative experiment V-A6 with the commercial dimethicone emulsion.

Examples A8 and A9: Cosmetic Composition—Shampoo

Example A8 below represents a cosmetic composition comprising the emulsion B4 from example 4; example A9 is a cosmetic composition comprising the emulsion B1 in combination with the dimethylpolysiloxane emulsion Belsil® DM 5102 E (available from Wacker Chemie AG). The active content—the amount of organopolysiloxane in the cosmetic compositions—is 1.3%.

The compositions of the shampoos are summarized in table 10.

Preparation Instructions:

0.30 part of Guar Hydroxypropyltrimonium Chloride is dispersed in water. 41.50 parts of Sodium Laureth Sulfate are stirred in slowly and the mixture is heated to 75° C. in stages. In the course of the heating, at 50° C., 0.20 part of PEG-150 Distearate is added, and at 65° C. 0.50 part of Glycol Distearate is added. The mixture is subsequently cooled. When 35° C. is reached, 0.90 part of Phenoxyethanol, Ethylhexylglycerin and the emulsions corresponding to the examples are added, followed by stirring for 5 minutes. Lastly, 13.4 parts of Cocamidopropyl Betaine are added and stirring is continued for 10 minutes.

A determination was made of the improvement in the softness of damaged hair tresses (in comparison to untreated hair tresses) after treatment with the shampoo formulations of examples A8 and A9. The results are collated in table 11.

TABLE 10

Shampoo formulations A8 and A9 (amounts in parts by weight)

| Constituents (INCI name) | Ex. A8 | Ex. A9 |
|---|---|---|
| Aqua (Water VES) | ad 100 | ad 100 |
| Guar Hydroxy-propyltrimonium Chloride [1] | 0.30 | 0.30 |
| Sodium Laureth Sulfate [2] | 41.50 | 41.50 |
| Glycol Distearate [3] | 0.50 | 0.50 |
| PEG-150 Distearate [4] | 0.20 | 0.20 |
| Emulsion B1 from example 1 | 1.43 | |
| Belsil ® DM 5102 E [5] (Dimethicone Emulsion) | 1.60 | |

TABLE 10-continued

Shampoo formulations A8 and A9 (amounts in parts by weight)

| Constituents (INCI name) | Ex. A8 | Ex. A9 |
|---|---|---|
| Emulsion B4 from example 4 | | 3.71 |
| Cocamidopropyl Betaine [6] | 13.33 | 13.33 |
| Phenoxyethanol, Ethylhexylglycerin [7] | 0.90 | 0.90 |

[1] Guar Hydroxypropyltrimonium Chloride: N-Hance ® 3196, Ashland.
[2] Sodium Laureth Sulfate: Genapol ® LRO 26.5%, Clariant GmbH
[3] Glycol Distearate: Hallstar ® EGDS, The Hallstar Company
[4] PEG-150 Distearate: Eumulgin ® EO 33, BASF AG
[5] Belsil ® DM 5102 E, available from Wacker Chemie AG
[6] Cocamidopropyl Betaine: Genagen ® CAB 30%, Clariant GmbH
[7] Phenoxyethanol, Ethylhexylglycerin: Euxyl PE 9010, Schülke & Mayr

TABLE 11

Shampoo/improvement in softness. All results in comparison to untreated hair tresses.

| Ex. | Improvement in softness [%] |
|---|---|
| A8 | 45 |
| A9 | 46 |

Damaged hair treated with the shampoos from examples A8 and A9 is rated in a test for assessing the softness (according to tensile testing) as being significantly softer than damaged, untreated hair.

Example A10: Cosmetic Composition—Shampoo

The example below represents a cosmetic composition comprising the emulsion B7 from example 7. The active content—the amount of organopolysiloxane in the cosmetic composition—is 1.0%.

The composition of the shampoos is summarized in table 12.

TABLE 12

Shampoo formulation A10 (figures in parts by weight)

| Constituents (INCI name) | Ex. A10 |
|---|---|
| Aqua (Water FD) | ad 100 |
| Polyquaternium-10 [1] | 0.10 |
| Sodium Laureth Sulfate [2] | 52.80 |
| PEG-150 Distearate [3] | 0.25 |
| Cocamide MEA [4] | 1.00 |
| Emulsion B7 from example 7 | 2.85 |
| Cocamidopropyl Betaine [5] | 10.06 |
| Phenoxyethanol, Ethylhexylglycerin [6] | 0.95 |

[1] Polyquaternium-10: UCARE Polymer JR 400, Dow Chemical.
[2] Sodium Laureth Sulfate: Genapol ® LRO 26.5%, Clariant GmbH
[3] PEG-150 Distearate: Eumulgin ® EO 33, BASF AG
[4] Cocamide MEA: Comperlan 100, BASF AG
[5] Cocamidopropyl Betaine: Genagen ® CAB 30%, Clariant GmbH
[7] Phenoxyethanol, Ethylhexylglycerin: Euxyl PE 9010, Schülke & Mavr Damaged hair treated with the shampoo from example A10 is softer (according to panel testing) than damaged untreated hair.

Example A11-A14

The examples below represent inventive cosmetic compositions A11-A14 according to table 13, comprising the emulsions B4, B5, B6 and B7 from examples 4 to 7. The active content—the amount of precrosslinked organopolysiloxane in cosmetic composition—is 2%.

TABLE 13

Rinse-off conditioners A11 to A14

| Constituents (INCI name) | Example A11 [parts by wt.] | Example A12 [parts by wt.] | Example A13 [parts by wt] | Example A14 [parts by wt.] |
|---|---|---|---|---|
| Water | ad 100 | ad 100 | ad 100 | ad 100 |
| Hydroxyethyl-cellulose[1] | 1.3 | 1.3 | 1.3 | 1.3 |
| Cetyl Alcohol[2] | 0.5 | 0.5 | 0.5 | 0.5 |
| Polysorbate 80[3] | 0.5 | 0.5 | 0.5 | 0.5 |
| Behentrimonium Chloride[4] | 0.2 | 0.2 | 0.2 | 0.2 |
| Stearyl Alcohol[5] | 0.5 | 0.5 | 0.5 | 0.5 |
| Citric Acid[6] | 0.1 | 0.1 | 0.1 | 0.1 |
| Tetrasodium EDTA[7] | 0.2 | 0.2 | 0.2 | 0.2 |
| Emulsion B4 from ex. 4 | 5.71 | | | |
| Emulsion B5 from ex. 5 | | 5.71 | | |
| Emulsion B6 from ex. 6 | | | 5.71 | |
| Emulsion B7 from ex. 7 | | | | 5.71 |
| Phenoxyethanol, Ethylhexylglycerin[8] | 0.9 | 0.9 | 0.9 | 0.9 |

The raw materials stated in table 13 are available under the following tradenames:
[1] Hydroxyethylcellulose: Natrosol 250 HR, Ashland
[2] Cetyl alcohol: cetyl alcohol, Merck KGaA
[3] Polysorbate 80: Tween ™ 80, Croda GmbH
[4] Behentrimonium Chloride: Genamin ® KDMP, Clariant GmbH
[5] Stearyl alcohol: Stearyl alcohol, Merck KGaA
[6] Citric Acid: citric acid, Sigma
[7] Tetrasodium EDTA: EDETA ® B Pulver, BASF Corporation
[8] Phenoxyethanol, Ethylhexylglycerin: Euxyl PE 9010, Schülke & Mayr Preparation Instructions:

Water is introduced and heated to 75° C. with stirring. 1.3 parts of hydroxyethylcellulose are added. When 65° C. is attained, 0.5 part of Polysorbate 80, 0.5 part of Stearyl Alcohol, 0.5 part of Cetyl Alcohol and 0.2 part of Behentrimonium Chloride are added. The mixture is stirred until 75° C. is reached and the ingredients are in solution. The mixture is then cooled. In the course of cooling, 0.1 part of Citric Acid and 0.2 part of Tetrasodium EDTA are added. At 35° C., 0.9 part of Phenoxyethanol, ethylhexylglycerin are added. With further stirring, the emulsion from the examples is added. The composition is homogenized with stirring for 15 minutes.

Wet Combing Force after Treatment of Damaged Hair with Rinse-Off Conditioner and after Simulation of Multiple Shampooings by Four-Hour Stirring of the Hair in an Aqueous Surfactant Solution

TABLE 14

Rinse-off conditioners/results of the reduction in wet combing force after treatment with an inventive rinse-off conditioner and after simulation of multiple shampooings by four-hour stirring of the hair in an aqueous surfactant solution. All results relate to the comparison relative to untreated hair tresses.

| Ex. | Reduction in wet combing force after conditioner treatment [%] | Reduction in wet combing force after conditioner treatment and subsequent stirring of the hair in an aqueous surfactant solution (persistence test) [%] |
|---|---|---|
| A11 | 78 | 37 |
| A12 | 82 | 63 |
| A13 | 83 | 69 |
| A14 | 87 | 44 |

By treatment with rinse-off conditioners comprising an aqueous emulsion of a precrosslinked organopolysiloxane B4, B5, B6 and B7, respectively, it is possible to achieve a significant reduction in the wet combing force for the hair tresses, in the region of 78% to 87%. In particular, a very high conditioning effect is retained after stirring of the treated hair in a surfactant solution, and this is reflected in a reduction in wet combing force of 37% for example A11, 44% for example A14, and values of 63% and 69% for examples A12 and A13.

Example A15—Rinse-Off Conditioner

The example below represents an inventive cosmetic composition A15 according to table 15, comprising the emulsion B3 from example 3. The active content—the amount of precrosslinked organopolysiloxane in the cosmetic composition—is 0.5%.

Preparation Instructions:

Water is introduced and heated to 75° C. with stirring. 1.3 parts of hydroxyethylcellulose are added. When 65° C. is attained, 0.5 part of Stearamidopropyl Dimethylamine, 1.0 part of Polysorbate 80, 3.0 parts of Stearyl Alcohol, 2.0 parts of Cetyl Alcohol and 1.8 parts of Behentrimonium Chloride are added. The mixture is stirred until 75° C. is reached and the ingredients are in solution. The mixture is then cooled. In the course of cooling, 0.2 part of Citric Acid and 0.2 part of Tetrasodium EDTA are added. At 35° C., 0.9 part of Phenoxyethanol, ethylhexylglycerin are added. With further stirring, the emulsion from the example is added. The composition is homogenized with stirring for 15 minutes.

TABLE 15

Rinse-off conditioner A15

| Constituent (INCI name) | Example A15 [parts by wt.] |
|---|---|
| Water | ad 100 |
| Hydroxyethyl-cellulose[1] | 1.3 |
| Cetyl Alcohol[2] | 2.0 |
| Polysorbate 80[3] | 1.0 |
| Behentrimonium Chloride[4] | 1.8 |
| Stearamidopropyl Dimethylamine[5] | 0.5 |
| Stearyl Alcohol[6] | 3.0 |

TABLE 15-continued

Rinse-off conditioner A15

| Constituent (INCI name) | Example A15 [parts by wt.] |
|---|---|
| Citric Acid [7] | 0.2 |
| Tetrasodium EDTA [8] | 0.2 |
| Emulsion B3 from ex. 3 | 1.87 |
| Phenoxyethanol, Ethylhexylglycerin [9] | 0.9 |

The raw materials stated in table 15 are available under the following tradenames:
[1] Hydroxyethylcellulose: Natrosol 250 HR, Ashland
[2] Cetyl alcohol: Cetyl alcohol, Merck KGaA
[3] Polysorbate 80: Tween ™ 80, Croda GmbH
[4] Behentrimonium Chloride: Genamin ® KDMP, Clariant GmbH
[5] Stearamidopropyl Dimethylamine, Incromine ™ SB, Croda GmbH
[6] Stearyl alcohol: Stearyl alcohol, Merck KGaA
[7] Citric Acid: Citric Acid, Sigma
[8] Tetrasodium EDTA: EDETA ® B Pulver, BASF Corporation
[9] Phenoxyethanol, Ethylhexylglycerin: Euxyl PE 9010, Schülke & Mayr By treating damaged hair with the inventive rinse-off conditioner from example A15, comprising an aqueous emulsion of a precrosslinked organopolysiloxane B3 (example 3), it is possible to achieve a significant reduction in the wet combing force for the hair tresses (in comparison to untreated hair tresses).

The invention claimed is:

1. A pre-crosslinked organopolysiloxane composition, comprising:
   wherein the pre-crosslinked organopolysiloxane contains on average at least one structural unit of the general formula (I)

$$SiRO_{2/2}—Y—SiRO_{2/2} \quad (I)$$

and units of the formula $$R_2SiO_{2/2} \quad (II),$$

wherein Y is a radical of the formula $$—R^2—[NR^3—R^4—]_x—NR^3—OC—[C(Z^1)(H)]_{k1}—[C(Z^2)(H)]_{k2}—CO—NR^3—[R^4—NR]_x—R^2—,$$

wherein R may be identical or different and denotes a monovalent hydrocarbon radical which has 1 to 18 carbon atoms and may contain one or more heteroatoms from the group of N, P, S, O, and halogen;
   wherein $R^2$ denotes an SiC-bonded, divalent linear or branched hydrocarbon radical having 3 to 18 carbon atoms or an alkylene radical having 3 to 10 carbon atoms;
   wherein $R^3$ denotes a hydrogen atom, an alkyl radical having 1 to 8 carbon atoms or an acyl radical, such as acetyl radical;
   wherein $R^4$ denotes a divalent hydrocarbon radical having 1 to 6 carbon atoms or an alkylene radical having 1 to 6 carbon atoms;
   wherein k1 is 0, 1, 2 or 3;
   wherein k2 is 0, 1, 2 or 3;
   wherein $Z^1$ is —OH, H or —$NHR^3$;
   wherein $Z^2$ is —OH, H or —$NHR^3$; and
   wherein the sum k1+k2 is ≥1 and that at least one radical $Z^1$ or $Z^2$ is a hydroxyl or $NHR^3$ group, and so the bridging group Y contains at least one hydroxyl or $NHR^3$ group.

2. The pre-crosslinked organopolysiloxane composition of claim 1, further comprising siloxane units, wherein the siloxane units have the formula (III)

$$R_{3-d}(OR^1)_dSiO_{1/2} \quad (III)$$

wherein R and Y have the definition indicated for them in claim 1;
wherein $R^1$ may be identical or different and denotes a hydrogen carbon or an alkyl radical which has 1 to 18 carbon atoms and which may be interrupted by one or more separate oxygen atoms; and
wherein is 0 or 1.

3. The composition of claim 1, wherein the composition is a cosmetic composition or an aqueous emulsion.

4. The composition of claim 3, wherein the cosmetic composition further comprises one or more conditioning agents.

5. The composition of claim 3, wherein the cosmetic composition is used for treating keratinic fibers or for cleansing and caring for keratinic fibers; or
   wherein the cosmetic composition is used for conditioning keratinic fibers, more particularly for facilitating the combability of keratinic fibers.

6. The composition of claim 5, wherein the keratinic fibers are hair.

7. A process for producing a pre-crosslinked organopolysiloxane composition, comprising the steps of:
   providing an amino-organopolysiloxanes of the formula (IV)

$$(R^1O)_dA_cR_{3-d-c}SiO(SiARO)_p(SiR_2O)_pSiR_{3-d-c}A_c(OR^1)_d \quad (IV),$$

reacted with reactive esters of the formula (V)

$$R^5O_2C—[C(Z^1)(H)]_{k1}—[C(Z^2)(H)]_{k2}—CO_2R_5 \ldots \quad (V),$$

wherein A is an amino radical of the general formula $$—R^2—[NR^3—R^4—]_xNR^3_2,$$

wherein R may be identical or different and denotes a monovalent hydrocarbon radical which has 1 to 18 carbon atoms and may contain-one or more heteroatoms from the group of N, P, S, O, and halogen;
   wherein $R^1$ may be identical or different and denotes a hydrogen atom or an alkyl radical which has 1 to 18 carbon atoms and may be interrupted by one or more separate oxygen atoms;
   wherein $R^5$ may be identical or different and denotes an O-bonded, saturated or unsaturated, linear or branched, monovalent hydrocarbon radical which has 1-20 carbon atoms per radical and may contain one or more heteroatoms from the group of N, P, S, O and halogen;
   wherein k1 is 0, 1, 2 or 3;
   wherein k2 is 0, 1, 2 or 3;
   wherein $Z^1$ is —OH, H or —$NHR^3$;
   wherein $Z^2$ is —OH, H or —$NHR^3$;
   wherein the sum k1+k2 is ≥1 and that at least radical $Z^1$ or $Z^2$ is a hydroxyl or $NHR^3$ group; and
   wherein the resulting pre-crosslinked organopolysiloxanes are optionally subsequently emulsified in water.

8. The process of claim 7, wherein the composition is a cosmetic composition.

9. The process of claim 8, wherein the cosmetic composition further comprises one or more conditioning agents.

10. The process of claim 8, wherein the cosmetic composition is used for treating keratinic fibers or for cleansing and caring for keratinic fibers; and/or
    wherein the cosmetic composition is used for conditioning keratinic fibers, more particularly for facilitating the combability of keratinic fibers.

11. The process of claim 10, wherein the keratinic fibers are hair.

12. The process of claim 8, further comprising the step of applying the cosmetic composition to keratinic fibers or hair, and then optionally rinsing with water.

13. An aqueous dispersion, comprising:
a pre-crosslinked organopolysiloxanes which contains on average at least one structural unit of the general formula (I)

$$SiRO_{2/2}-Y-SiRO_{2/2} \qquad (I)$$

and units of the formula $$R_2SiO_{2/2} \qquad (II),$$

wherein Y is a radical of the formula $$-R^2-[NR^3-R^4-]_x-NR^3-OC-[C(Z^1)(H)]_{k1}-$$
$$[C(Z^2)(H)]_{k2}-CO-NR^3-[R^4-NR]_x-R^2$$

wherein R may be identical or different and denotes a monovalent hydrocarbon radical which has 1 to 18 carbon atoms and may contain one or more heteroatoms from the group of N, P, S, O, and halogen;
wherein $R^2$ denotes an SiC-bonded, divalent linear or branched hydrocarbon radical having 3 to 18 carbon atoms or an alkylene radical having 3 to 10 carbon atoms;
wherein $R^3$ denotes a hydrogen atom, an alkyl radical having 1 to 8 carbon atoms or an acyl radical, such as acetyl radical;
wherein $R^4$ denotes a divalent hydrocarbon radical having 1 to 6 carbon atoms or an alkylene radical having 1 to 6 carbon atoms;
wherein k1 is 0, 1, 2 or 3;
wherein k2 is 0, 1, 2 or 3;
wherein x is 0, 1, 2, 3 or 4;
wherein $Z^1$ is —OH, H or —$NHR^3$;
wherein $Z^2$ is —OH, H or —$NHR^3$; and
wherein the sum k1+k2 is ≥1 and that at least one radical $Z^1$ or $Z^2$ is a hydroxyl or $NHR^3$ group, and so the bridging group Y contains at least one hydroxyl or $NHR^3$ group.

14. The aqueous dispersion of claim 13, further comprising siloxane units of the formula (III)

$$R_{3-d}(OR^1)_d SiO_{1/2} \qquad (III),$$

wherein R has the definition indicated for it in claim 13;
wherein $R^1$ may be identical or different and denotes a hydrogen carbon or an alkyl radical which has 1 to 18 carbon atoms and which may be interrupted by one or more separate oxygen atoms; and
wherein d is 0 or 1.

15. The aqueous dispersion of claim 13, wherein Y is a radical of the formula $$-R^2-[NR^3-R^4-]_x-NR^3-OC-[C(Z^1)(H)]_{k1}-$$
$$[C(Z^2)(H)]_{k2}-CO-NR^3-[R^4-NR]_x-R^2$$

wherein x' is 0 or 1; and
wherein $R^2$ is a radical of the formula —$(CH_2)_3$— or —$CH_2$—CH $(CH_3)$—$CH_2$—.

16. The aqueous dispersion of claim 13, wherein the aqueous dispersion is a cosmetic composition or an aqueous emulsion.

17. The aqueous dispersion of claim 16, wherein the cosmetic composition further comprises one or more conditioning agents.

18. The aqueous dispersion of claim 16, wherein the cosmetic composition is used for treating keratinic fibers or for cleansing and caring for keratinic fibers; or wherein the cosmetic composition is used for conditioning keratinic fibers, more particularly for facilitating the combability of keratinic fibers.

19. The aqueous dispersion of claim 18, wherein the keratinic fibers are hair.

20. A process for producing the aqueous dispersion of pre-crosslinked organopolysiloxanes, comprising the steps of:
reacting an aqueous dispersion, of aminoorganopolysiloxanes (1) of the formula (IV)

$$(R^1O)_d A_e R_{3-d-e} SiO(SiARO)_p (SiR_2O)_q SiR_{3-d-e} A_e$$
$$(OR^1)_d \qquad (IV)$$

wherein A is an amino radical of the general formula $$-R^2-[NR^3-R^4-]_x NR^3_2;$$

wherein R may be identical or different and denotes a monovalent hydrocarbon radical which has 1 to 18 carbon atoms and may contain one or more heteroatoms from the group of N, P, S, O, and halogen;
wherein $R^1$ may be identical or different and denotes a hydrogen atom or an alkyl radical which has 1 to 18 carbon atoms and may be interrupted by one or more separate oxygen atoms;
wherein $R^2$ denotes an SiC-bonded, divalent linear or branched hydrocarbon radical having 3 to 18 carbon atoms or an alkylene radical having 3 to 10 carbon atoms;
wherein $R^3$ denotes a hydrogen atom, an alkyl radical having 1 to 8 carbon atoms or an acyl radical or an acetyl radical;
wherein $R^4$ denotes a divalent hydrocarbon radical having 1 to 6 carbon atoms or an alkylene radical having 1 to 6 carbon atoms, wherein d is 0 or 1;
wherein e is 0 or 1;
wherein p is an integer of at least one and at most 1000;
wherein q is 0 or an integer from 1 to 2000; and
wherein x is 0, 1, 2, 3 or 4;
with reactive esters (2) of the formula (V)

$$R^5O_2C-[C(Z^1)(H)]_{k1}-[C(Z^2)(H)]_{k2}-CO_2R_5 \ldots \qquad (V),$$

wherein $R^5$ may be identical or different and denotes an O-bonded, saturated or unsaturated, linear or branched, monovalent hydrocarbon radical which has 1-20 carbon atoms per radical and may contain one or more heteroatoms from the group of N, P, S, O and halogen;
wherein k1 is 0, 1, 2 or 3;
wherein k2 is 0, 1, 2 or 3;
wherein $Z^1$ is —OH, H or —$NHR^3$;
wherein $Z^2$ is —OH, H or —$NHR^3$;
with the provisos that the sum k1+k2 is ≥1 and that at least one radical $Z^1$ or $Z^2$ is a hydroxyl or NHR3 group.

21. The process of claim 20, wherein A is an amino radical of the formula $$-R^2-[NH-CH_2CH_2-]_{x'}-NH_2,$$

wherein x' is 0 or 1; and
wherein $R^2$ is a radical of the formula —$(CH_2)_3$— or —$CH_2$—CH $(CH_3)$—$CH_2$—.

22. The process of claim 20, wherein the reactive esters (2) are dimethyl tartrates and diethyl tartrates.

23. The process of claim 20, wherein the aqueous dispersion is a cosmetic composition or wherein the aqueous dispersion is an aqueous emulsion.

24. The process of claim 23, wherein the cosmetic composition further comprises one or more conditioning agents.

25. The process of claim 23, wherein the cosmetic composition is used for treating keratinic fibers or for cleansing and caring for keratinic fibers; or wherein the cosmetic composition is used for conditioning keratinic fibers, more particularly for facilitating the combability of keratinic fibers.

26. The process of claim 25, wherein the keratinic fibers are hair.

27. The process of claim 23, further comprising the step of applying the cosmetic composition to keratinic fibers or hair, and then optionally rinsing with water.

* * * * *